United States Patent
Stegmann et al.

(10) Patent No.: US 8,163,215 B2
(45) Date of Patent: Apr. 24, 2012

(54) METHOD OF FORMING REGENERATED CARBOHYDRATES WITH SOLVENT SYSTEMS BASED ON MOLTEN IONIC LIQUIDS

(75) Inventors: Veit Stegmann, Mannheim (DE); Klemens Massonne, Bad Duerkheim (DE); Matthias Maase, Speyer (DE); Eric Uerdingen, Speyer (DE); Michael Lutz, Speyer (DE); Frank Hermanutz, Leonberg (DE); Frank Gaehr, Esslingen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 12/158,869

(22) PCT Filed: Dec. 22, 2006

(86) PCT No.: PCT/EP2006/012478
§ 371 (c)(1),
(2), (4) Date: Jun. 23, 2008

(87) PCT Pub. No.: WO2007/076979
PCT Pub. Date: Jul. 12, 2007

(65) Prior Publication Data
US 2008/0269477 A1    Oct. 30, 2008

(30) Foreign Application Priority Data

Dec. 23, 2005   (DE) .................. 10 2005 062 608
Aug. 1, 2006    (DE) .................. 10 2006 035 830

(51) Int. Cl.
*D01F 2/24*     (2006.01)
*D01D 5/04*     (2006.01)
*B29C 47/00*    (2006.01)
*C08B 16/00*    (2006.01)
*C07H 1/00*     (2006.01)
*B32B 23/00*    (2006.01)

(52) U.S. Cl. ............... 264/211.1; 264/204; 264/207; 536/57; 536/1.11; 428/393

(58) Field of Classification Search .............. None
See application file for complete search history.

(56) References Cited

U.S. PATENT DOCUMENTS

| | | | |
|---|---|---|---|
| 2,339,012 A | 1/1944 | Hecht et al. | |
| 4,367,191 A * | 1/1983 | Cuculo et al. | 264/187 |
| 5,580,354 A * | 12/1996 | Taylor | 8/538 |
| 6,210,801 B1 * | 4/2001 | Luo et al. | 428/393 |
| 6,331,354 B1 * | 12/2001 | Sealey et al. | 428/393 |
| 2003/0157351 A1 * | 8/2003 | Swatloski et al. | 428/478.4 |

FOREIGN PATENT DOCUMENTS

| | | |
|---|---|---|
| DE | 10 2004 027 196 | 12/2005 |
| WO | 01 74906 | 10/2001 |
| WO | 03 029329 | 4/2003 |
| WO | 03 039719 | 5/2003 |

OTHER PUBLICATIONS

U.S. Appl. No. 12/747,372, filed Jun. 10, 2010, Degen, et al.
U.S. Appl. No. 12/523,740, filed Jul. 20, 2009, Balensiefer, et al.
U.S. Appl. No. 12/523,327, filed Jul. 16, 2009, Balensiefer, et al.
U.S. Appl. No. 12/598,934, filed Nov. 5, 2009, Tishkov, et al.

* cited by examiner

*Primary Examiner* — Christina Johnson
*Assistant Examiner* — Benjamin Schiffman
(74) *Attorney, Agent, or Firm* — Oblon, Spivak, McClelland, Maier & Neustadt, L.L.P.

(57) ABSTRACT

A solution system for biopolymers in the form of carbohydrates based on a molten ionic liquid, additives optionally being contained in the solution system, is described. This solution system contains a protic solvent or a mixture of several protic solvents, and in the case where the protic solvent is solely water, this is present in the solution system in an amount of more than about 5 wt. %. Carbohydrates can be incorporated into the solution system, in particular in the form of starch, cellulose and derivatives thereof, and it can then be used for regeneration of the carbohydrates contained therein. A particularly advantageous process for the preparation of the solution system containing the carbohydrates and for the preparation of regenerated carbohydrates, in particular in the form of regenerated cellulose fibers, is moreover described. The invention accordingly also provides such spun fibers as are distinguished in that they are non-fibrillating. The invention offers in particular economic advantages over the systems of the prior art.

22 Claims, No Drawings

METHOD OF FORMING REGENERATED CARBOHYDRATES WITH SOLVENT SYSTEMS BASED ON MOLTEN IONIC LIQUIDS

The invention relates to solution systems for biopolymers in the form of carbohydrates based on a molten ionic liquid, additives optionally being contained in the solution system, this solution system with a content of carbohydrates, the preparation thereof and its use for the preparation of regenerated carbohydrates and of shaped articles of regenerated carbohydrates, in particular spun fibers.

Cellulose, with a content of about $700 \times 10^9$ tonnes in the estimated biomass reserves of $1.5 \times 10^{12}$ tonnes on earth, is the most important representative in the group of organic biopolymers. The pulp which is obtained from wood and cotton and has a very high content of cellulose is currently the most important raw material basis for the production of paper, cardboard and regenerated cellulose fibers and films.

Some solvent systems have been developed in the past for processing cellulose. The viscose process, which has already been known for a long time, is still of the greatest industrial importance. In this, cellulose is first derivatized to xanthogenate and this is then dissolved in dilute sodium hydroxide solution. By regeneration in special coagulation baths, the derivatization is reversed and cellulose is made available in this way. Nevertheless, large amounts of salts and sulfur-containing waste gases are formed due to the process, and must be treated with the aid of after-treatment technologies.

In the course of the increasing environmental awareness of the last decade, developments have been forced for direct dissolving of cellulose with a lower unavoidable production of waste and undesirable emissions. The process with the solvent N-methylmorpholine N-oxide monohydrate (NMMO) has currently acquired the most important industrial significance here. Disadvantages in this process are the narrow solution window in the ternary system of NMMO, water and cellulose, the use of a solvent having an oxidizing action and the system-related fibrillation of the products produced.

Ionic liquids can serve as a substitute for conventional organic solvents. They are organic salts which melt at low temperatures (<100° C.), a novel class of solvents having a non-molecular, ionic character. Ionic liquids without substantial impurities have no measurable vapor pressure. Their polarity and therefore their property as a solvent can be adjusted according to the choice of the cation and anion.

U.S. Pat. No. 1,943,176 teaches the use of organic salts of the substance classes of N-alkyl- and N-aryl-substituted pyridinium chlorides in a mixture with nitrogen-containing bases (e.g. pyridine) for dissolving non-derivatized cellulose. Nevertheless, this invention has never acquired industrial importance. U.S. Pat. No. 2,339,012 describes dissolving of cellulose with similarly substituted pyridinium hydroxides in a mixture with water or alcohols. Here also, industrial realization appears to have failed due to a number of unfavorable industrial prerequisites for the direct dissolving of cellulose (e.g. high pressures).

By using a new class of ionic liquids, it was possible to overcome the abovementioned disadvantages. In a new development, WO 2003/029329 describes the use in particular of imidazole-based ionic liquids. These are suitable as flexible solvents particularly for direct dissolving of cellulose in the absence of water and other nitrogen-containing organic bases. A disadvantage is that the use of water during preparation of the solution must be omitted. Admixing of more than 5 wt. % of water is expressly ruled out. Since the ionic liquids must be recovered virtually completely, for economic and environmental reasons, and the product consolidation takes place predominantly in an aqueous medium, this is a considerable limitation which has hitherto impeded industrial conversion. Precisely the separating off of water contents of less than 5 wt. % by distillation is industrially difficult, extremely energy-intensive and therefore economically inefficient.

The present invention was therefore based on the object of further developing the solution systems described above and the process mentioned such that it is possible, in an economical and environment-friendly manner, advantageously to regenerate biopolymers, in particular in the form of starch, of cellulose and of derivatives of starch and cellulose.

This object is achieved by the invention explained in the following, in which, inter alia, the solution system contains a protic solvent or a mixture of several protic solvents, and in the case where the protic solvent is solely water, this is present in the solution system in an amount of more than about 5 wt. %.

An essential feature is accordingly the incorporation of a protic solvent into a solution system for biopolymers in the form of carbohydrates, additives also optionally being contained in the solution system. The prior art such as is described in WO 2003/029329 has taught against the incorporation of protic solvents, in particular against the incorporation of water in an amount of more than 5 wt. %. According to the prior art, it is thus said to be particularly preferable to limit the amount of water to less than 1 wt. %. In the context of the invention, it has now been found that the incorporation of water or other protic solvents is of comprehensive advantage for the overall process of regeneration of carbohydrates, in particular cellulose. When water is incorporated in the context of the teaching according to the invention, the result is that during the regeneration in, for example, a coagulation medium (precipitating medium) of water, the valuable ionic liquid no longer has to be freed completely from the water or from the protic solvent, but the recovered solution system can still contain water in an amount of more than 5 wt. %, so that complete removal of the water can be omitted. This means a lower expenditure of energy and a considerable advantage.

The core idea of the invention is therefore, contrary to the strict instruction of the prior art, that precisely a protic solvent is added in a coordinated amount to the solution system according to the invention, and in the case where the protic solvent is solely water, this is present in the solution system in an amount of more than 5 wt. %. Water has the advantage over other protic solvents that it is very environment-friendly and has a positive influence on the viscosity of the solution and the structure formation during the product consolidation. Furthermore, water is very inexpensive compared with comparable suitable protic solvents.

The basic idea that cellulose is regenerated in an ionic liquid, as described in the prior art, is accordingly retained according to the invention. Nevertheless, to the ionic liquid is admixed precisely a liquid non-solvent for the carbohydrate, in particular for cellulose, which is miscible with the ionic liquid itself, but the raising of the mixing ratio of protic solvent/ionic liquid in the solvent containing the carbohydrate leads to the desired coagulation of the carbohydrate.

In the case where water is used as the sole protic solvent, it is preferable for the amount thereof in the solution system to be more than 6 wt. %, in particular to lie between about 6 and 15 wt. %. The range of from about 7 to 12 wt. % of water is very particularly preferred. The person skilled in the art is not subject to any substantial limitation in the choice of the further protic solvent which may be advantageous in the individual case.

The term "protic solvent" is clear to the person skilled in the art. According to C. Reichardt, "Solvents and Solvent Effects in Organic Chemistry", 3rd edition, p. 82-84, 2003, Wiley-VCH, Weinheim, protic solvents contain hydrogen atoms bonded to electronegative elements. Typical examples of these are, in addition to water, alcohols, amines (amines are to be understood as meaning aliphatic and cycloaliphatic amines), acid amides and carboxylic acids. They can be, in particular, lower alcohols, such as, in particular, methanol, ethanol, 1-propanol, 2-propanol, 1-butanol, 2-butanol, 2-methyl-1-propanol and/or 2-methyl-2-propanol, preferably methanol, ethanol, propanol and/or butanol. The particularly advantageous protic solvents furthermore include glycols, amines, acid amides and carboxylic acids, preferably glycols, such as monoethylene glycol, diethylene glycol, mono-1,2-propylene glycol, di-1,2-propylene glycol, 1,2-butylene glycol, 2,3-butylene glycol and/or glycerol, and amines, such as methylamine, ethylamine, n-propylamine, i-propylamine, n-butylamine, dimethylamine, diethylamine, di-n-propylamine, di-n-butylamine, pyrrolidine, piperidine, piperazine, N-methyl-piperazine, N-ethylpiperazine, morpholine, ethylenediamine, 1,2-propylenediamine, 1,3-propylenediamine, di-(2-cyanoethyl)amine, di-(2-amino-ethyl)amine, tri-(2-aminoethyl)amine, ethanolamine, diethanolamine, triethanolamine, propanolamine, dipropanolamine and/or tripropanolamine. The alcohols named are to be regarded as preferred. It is therefore also preferable for the protic solvent, in particular the alcohol, to be present in the solution system in an amount of at least about 0.1 wt. %, in particular of at least about 1 wt. %. It is very particularly preferable for the protic solvent, in particular the alcohol, to be contained in the solution system in an amount of from about 1 to 10 wt. %, in particular in an amount of from about 2 to 5 wt. %. The protic solvents can be employed as a mixture, which may be of advantage in the individual case. This applies in particular to admixing of water in the case of alcohols.

The person skilled in the art is not subject to any substantial limitations with respect to the choice of ionic liquids for realizing the present invention.

Ionic liquids which are particular suitable for the purposes of the invention are therefore to be described as follows:

Ionic liquids in the context of the present invention are preferably (A) salts of the general formula (I)

$$[A]^+_n[Y]^{n-} \quad (I)$$

in which n represents 1, 2, 3 or 4, $[A]^+$ represents a quaternary ammonium cation, an oxonium cation, a sulfonium cation or a phosphonium cation and $[Y]^{n-}$ represents a mono-, di-, tri- or tetravalent anion;

(B) mixed salts of the general formulae (II)

$[A^1]^+[A^2]^+[Y]^{n-}$ (IIa), wherein n=2;

$[A^1]^+[A^2]^+[A^3]^+[y]^{n-}$ (IIb), wherein n=3; or $[A^1]^+[A^2]^+[A^3]^+[A^4]^+[Y]^{n-}$ (IIc), wherein n=4; and wherein $[A^1]^+$, $[A^2]^+$, $[A^3]^+$ and $[A^4]^+$ independently of one another are chosen from the groups mentioned for $[A]^+$ and $[Y]^{n-}$ has the meaning mentioned under (A).

Compounds which are suitable for forming the cation $[A]^+$ of ionic liquids are known e.g. from DE 102 02 838 A1. Such compounds can thus contain oxygen, phosphorus, sulfur or, in particular, nitrogen atoms, for example at least one nitrogen atom, preferably 1 to 10 nitrogen atoms, particularly preferably 1 to 5, very particularly preferably 1 to 3 and in particular 1 to 2 nitrogen atoms. They can optionally also contain further hetero atoms, such as oxygen, sulfur or phosphorus atoms. The nitrogen atom is a suitable carrier of the positive charge in the cation of the ionic liquid, from which a proton or an alkyl radical can then transfer to the anion in equilibrium in order to generate an electrically neutral molecule.

In the case where the nitrogen atom is the carrier of the positive charge in the cation of the ionic liquid, in the synthesis of the ionic liquids a cation can first be generated by quaternization on the nitrogen atom of, for example, an amine or nitrogen-containing heterocyclic compound. The quaternization can be effected by alkylation of the nitrogen atom. Salts with different anions are obtained, depending on the alkylating reagent used. In cases where it is not possible for the desired anion already to be formed during the quaternization, this can be effected in a further synthesis step. Starting from, for example, an ammonium halide, the halide can be reacted with a Lewis acid, a complex anion being formed from the halide and Lewis acid. Alternatively to this, exchange of a halide ion for the desired anion is possible. This can be effected by addition of a metal salt with coagulation of the metal halide formed, via an ion exchanger or by displacement of the halide ion by a strong acid (the hydrogen halide acid being liberated).

Suitable processes are described, for example, in Angew. Chem. 2000, 112, p. 3926-3945 and the literature cited therein.

Suitable alkyl radicals with which the nitrogen atom in the amines or nitrogen-containing heterocyclic compounds can be quaternized, for example, are $C_1$-$C_{18}$-alkyl, preferably $C_1$-$C_{10}$-alkyl, particularly preferably $C_1$-$C_6$-alkyl and very particularly preferably methyl. The alkyl group can be unsubstituted or can contain one or more identical or different substituents.

Preferred compounds are those which contain at least one five- to six-membered heterocyclic radical, in particular a five-membered heterocyclic radical, which contains at least one nitrogen atom and optionally an oxygen or sulfur atom. Compounds which are likewise particularly preferred are those which contain at least one five- to six-membered heterocyclic radical which contains one, two or three nitrogen atoms and a sulfur or an oxygen atom, very particularly preferably those with two nitrogen atoms. Aromatic heterocyclic compounds are furthermore preferred.

Particularly preferred compounds are those which have a molecular weight of below 1,000 g/mol, very particularly preferably below 500 g/mol and in particular below 300 g/mol.

Preferred cations are furthermore those which are chosen from the compounds of the formulae (IIIa) to (IIIw)

(IIIa)

(IIIb)

-continued
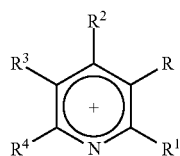
(IIIc)
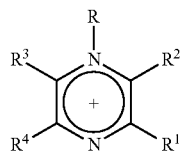
(IIId)
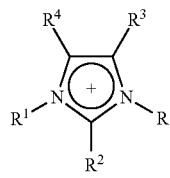
(IIIe)
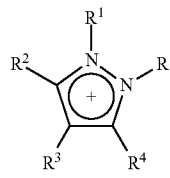
(IIIf)
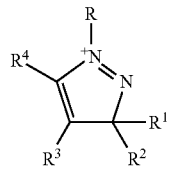
(IIIg)
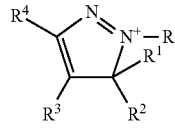
(IIIg′)
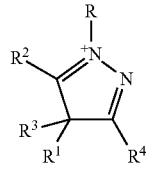
(IIIh)
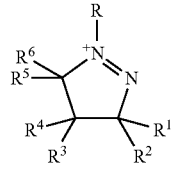
(IIIi)
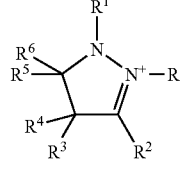
(IIIj)
-continued
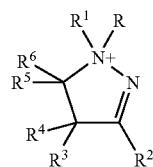
(IIIj′)
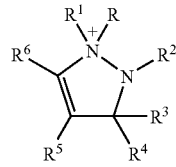
(IIIk)
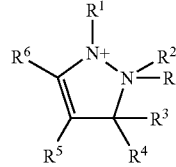
(IIIk′)
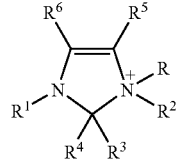
(IIIl)
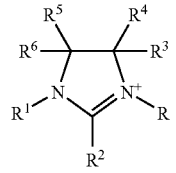
(IIIm)
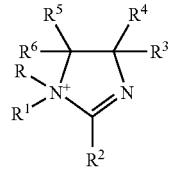
(IIIm′)
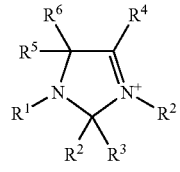
(IIIn)
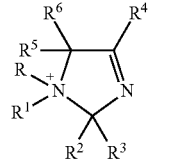
(IIIn′)
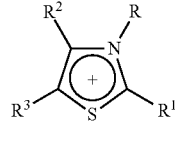
(IIIo)

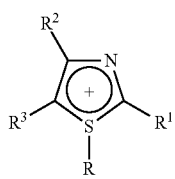
(IIIo')

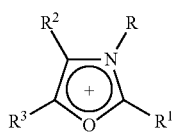
(IIIp)

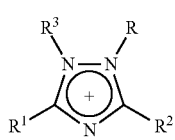
(IIIq)

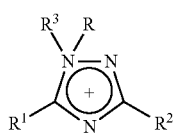
(IIIq')

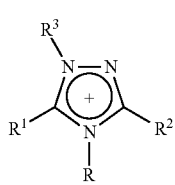
(IIIq")

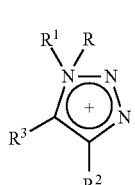
(IIIr)

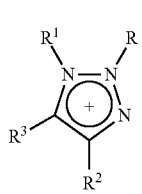
(IIIr')

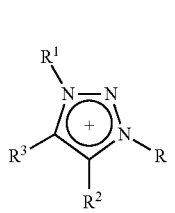
(IIIr")

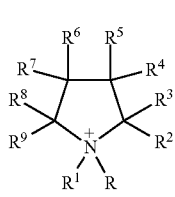
(IIIs)

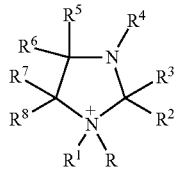
(IIIt)

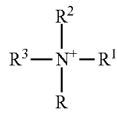
(IIIu)

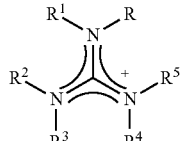
(IIIv)

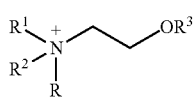
(IIIw)

and oligomers which contain these structures.

Further suitable cations are compounds of the general formula (IIIx) and (IIIy)

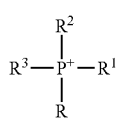
(IIIx)

(IIIy)

and oligomers which contain these structures.

In the abovementioned formulae (IIIa) to (IIIy)
the radical R represents hydrogen, a carbon-containing organic, saturated or unsaturated, acyclic or cyclic, aliphatic, aromatic or araliphatic radical having 1 to 20 carbon atoms which is unsubstituted or interrupted or substituted by 1 to 5 hetero atoms or functional groups; and the radicals $R^1$ to $R^9$ independently of one another represent hydrogen, a sulfo group or a carbon-containing organic, saturated or unsaturated, acyclic or cyclic, aliphatic, aromatic or araliphatic radical having 1 to 20 carbon atoms which is unsubstituted or interrupted or substituted by 1 to 5 hetero atoms or functional groups, wherein the radicals $R^1$ to $R^9$ which are bonded to a carbon atom (and not to a hetero atom) in the abovementioned formulae (III) can additionally also represent halogen or a functional group; or two adjacent radicals from the series consisting of $R^1$ to $R^9$ together also represent a divalent, carbon-containing organic, saturated or unsaturated, acyclic or cyclic, aliphatic, aromatic or araliphatic radical having 1 to 30 carbon atoms which is unsubstituted or interrupted or substituted by 1 to 5 hetero atoms or functional groups.

Possible hetero atoms in the definition of the radicals R and $R^1$ to $R^9$ are in principle all hetero atoms which are capable of replacing formally a —$CH_2$—, a —CH=, a —C— or a =C= group. If the carbon-containing radical contains hetero atoms, oxygen, nitrogen, sulfur, phosphorus and silicon are preferred. Preferred groups which may be mentioned in particular are —O—, —S—, —SO—, —$SO_2$—, —NR'—, —N=, —PR'—, —PR—' and —$SiR'_2$—, wherein the radicals R' are the remaining part of the carbon-containing radical. The radicals $R^1$ to $R^9$ here in the cases where these are bonded to a carbon atom (and not to a hetero atom) in the above-mentioned formulae (III) can also be bonded directly via the hetero atom.

Possible functional groups are in principle all functional groups which can be bonded to a carbon atom or a hetero atom. Suitable examples which may be mentioned are —OH (hydroxyl), =O (in particular as the carbonyl group), —$NH_2$ (amino), —NHR, —$NR_2$, =NH (imino), —COOH (carboxyl), —$CONH_2$ (carboxamide), —$SO_3H$ (sulfo) and —CN (cyano), in particular —OH (hydroxyl), =O (in particular as the carbonyl group), —$NH_2$ (amino), =NH (imino), —COOH (carboxyl), —$CONH_2$ (carboxamide), —$SO_3H$ (sulfo) and —CN (cyano). Functional groups and hetero atoms can also be directly adjacent, so that combinations of several adjacent atoms, such as, for example, —O— (ether), —S-(thioether), —COO— (ester), —CONH— (secondary amide) or —CONR'—(tertiary amide), are also included, for example di-($C_1$-$C_4$-alkyl)-amino, $C_1$-$C_4$-alkoxycarbonyl or $C_1$-$C_4$-alkoxy.

Halogens which may be mentioned are fluorine, chlorine, bromine and iodine.

Preferably, the radical R represents
unbranched or branched $C_1$-$C_{18}$-alkyl having a total of 1 to 20 carbon atoms which is unsubstituted or substituted once to several times by hydroxyl, halogen, phenyl, cyano, $C_1$-$C_6$-alkoxycarbonyl and/or $SO_3H$, such as, for example, methyl, ethyl, 1-propyl, 2-propyl, 1-butyl, 2-butyl, 2-methyl-1-propyl, 2-methyl-2-propyl, 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, 2-hydroxy-ethyl, benzyl, 3-phenylpropyl, 2-cyanoethyl, 2-(methoxycarbonyl)-ethyl, 2-(ethoxycarbonyl)-ethyl, 2-(n-butoxycarbonyl)-ethyl, trifluoromethyl, di-fluoromethyl, fluoromethyl, pentafluoroethyl, heptafluoropropyl, heptafluoroisopropyl, nonafluorobutyl, nonafluoroisobutyl, undecylfluoro-pentyl, undecylfluoroisopentyl, 6-hydroxyhexyl and propylsulfonic acid;

glycols, butylene glycols and oligomers thereof having 1 to 100 units and a hydrogen or a $C_1$-$C_8$-alkyl as the end group, such as, for example, $R^AO$—(CHR$^B$—$CH_2$—O)$_m$—CHR$^B$—$CH_1$— or $R^AO$—($CH_2CH_2CH_2CH_2$O)$_m$—$CH_2CH_2CH_2CH_2$O— where $R^A$ and $R^B$ are preferably hydrogen, methyl or ethyl and m is preferably 0 to 3, in particular 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxamidecyl and 3,6,9,12-tetraoxatetradecyl;

vinyl; and
allyl
N,N-di-$C_1$-$C_6$-alkylamino, such as, for example, N,N-dimethylamino and N,N-diethylamino.

Preferably, the radicals $R^1$ to $R^9$ independently of one another represent
hydrogen;
halogen;
a functional group
$C_1$-$C_{18}$-alkyl optionally substituted by functional groups, aryl, alkyl, aryloxy, alkoxy, halogen, hetero atoms and/or heterocyclic radicals and/or interrupted by one or more oxygen and/or sulfur atoms and/or one or more substituted or unsubstituted imino groups;
$C_2$-$C_{18}$-alkenyl optionally substituted by functional groups, aryl, alkyl, aryloxy, alkoxy, halogen, hetero atoms and/or heterocyclic radicals and/or interrupted by one or more oxygen and/or sulfur atoms and/or one or more substituted or unsubstituted imino groups;
$C_6$-$C_{12}$-aryl optionally substituted by functional groups, aryl, alkyl, aryloxy, alkoxy, halogen, hetero atoms and/or heterocyclic radicals;
$C_5$-$C_{12}$-cycloalkyl optionally substituted by functional groups, aryl, alkyl, aryloxy, alkoxy, halogen, hetero atoms and/or heterocyclic radicals;
$C_5$-$C_{12}$-cycloalkenyl optionally substituted by functional groups, aryl, alkyl, aryloxy, alkoxy, halogen, hetero atoms and/or heterocyclic radicals;
a five- to six-membered heterocyclic radical containing oxygen, nitrogen and/or sulfur atoms and optionally substituted by functional groups, aryl, alkyl, aryloxy, alkoxy, halogen, hetero atoms and/or heterocyclic radicals; or two adjacent radicals together represent
an unsaturated, saturated or aromatic ring optionally substituted by functional groups, aryl, alkyl, aryloxy, alkoxy, halogen, hetero atoms and/or heterocyclic radicals and optionally interrupted by one or more oxygen and/or sulfur atoms and/or one or more substituted or unsubstituted imino groups.

$C_1$-$C_{18}$-Alkyl optionally substituted by functional groups, aryl alkyl, aryloxy, alkoxy, halogen, hetero atoms and/or heterocyclic radicals is preferably methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, 2-ethylhexyl 2,4,4-trimethylpentyl, 1,1,3,3-tetramethylbutyl, 1-nonyl, 1-decyl, 1-undecyl, 1-dodecyl, 1-tridecyl, 1-tetradecyl, 1-pentadecyl, 1-hexadecyl, 1-heptadecyl, 1-octadecyl, cyclopentylmethyl, 2-cyclopentylethyl, 3-cyclopentyl-propyl, cyclohexylmethyl, 2-cyclohexylethyl, 3-cyclohexylpropyl, benzyl (phenylmethyl), diphenylmethyl (benzhydryl), triphenylmethyl, 1-phenylethyl, 2-phenylethyl, 3-phenylpropyl, α,α-dimethylbenzyl, p-tolylmethyl, 1-(p-butylphenyl)-ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)-ethyl, methoxy, ethoxy, formyl, 1,3-dioxolan-2-yl, 1,3-dioxan-2-yl, 2-methyl-1,3-dioxolan-2-yl, 4-methyl-1,3-dioxolan-2-yl, 2-hydroxyethyl, 2-hydroxypropyl, 3-hydroxypropyl, 4-hydroxybutyl, 6-hydroxyhexyl, 2-aminoethyl, 2-aminopropyl, 3-amino-propyl, 4-aminobutyl, 6-aminohexyl, 2-methylaminoethyl, 2-methylaminopropyl, 3-methylaminopropyl, 4-methyl-aminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxyethyl, 2-phenoxypropyl, 3-phenoxypropyl, 4-phenoxybutyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl, 6-ethoxyhexyl, acetyl, $C_mF_{2(m-a)+(1-b)}H_{2a+b}$ where m is 1 to 30, $0 \leq a \leq m$ and b=0 or 1 (for example $CF_3$, $C_2F_5$, $CH_2CH_2$—$C_{(m-2)}F_{2(m-2)+1}$, $C_6F_{13}$, $C_8F_{17}$, $C_{10}F_{21}$, $C_{12}R_{25}$), chloromethyl, 2-chloroethyl, trichloromethyl, 1,1-dimethyl-2-chloro-ethyl, methoxymethyl, 2-butoxyethyl, diethoxymethyl, diethoxyethyl, 2-isopropoxyethyl, 2-butoxypropyl, 2-octyloxyethyl, 2-methoxyisopropyl, 2-(methoxycarbonyl)-ethyl, 2-(ethoxycarbonyl)-ethyl, 2-(n-butoxycarbonyl)-ethyl, butylthiomethyl, 2-dodecylthioethyl, 2-phenylthioethyl, 5-hydroxy-3-oxapentyl, 8-hydroxy-3,6-dioxa-octyl, 11-hydroxy-3,6,9-trioxaundecyl, 7-hydroxy-4-oxa-heptyl, 11-hydroxy-4,8-dioxaundecyl, 15-hydroxy-4,8,12-trioxa-pentadecyl, 9-hydroxy-5-oxa-nonyl, 14-hydroxy-5,10-dioxa-tetradecyl, 5-methoxy-3-oxa-pentyl, 8-methoxy-3,6-dioxa-octyl, 11-methoxy-3,6,9-trioxa-undecyl, 7-methoxy-4-oxa-heptyl, 11-methoxy-4,8-dioxa-undecyl, 15-methoxy-4,8,12-trioxa-pentadecyl, 9-methoxy-5-oxa-nonyl, 14-methoxy-5,10-dioxa-tetradecyl, 5-ethoxy-3-oxa-pentyl, 8-ethoxy-3,6-dioxa-octyl, 11-ethoxy-3,6,9-trioxa-undecyl, 7-ethoxy-4-oxa-heptyl, 11-ethoxy-4,8-dioxa-undecyl, 15-ethoxy-4,8,12-trioxa-pentadecyl, 9-ethoxy-5-oxa-nonyl or 14-ethoxy-5,10-oxa-tetradecyl.

$C_2$-$C_{18}$-Alkenyl optionally substituted by functional groups, aryl, alkyl, aryloxy, alkoxy, halogen, hetero atoms and/or heterocyclic radicals and/or interrupted by one or more oxygen and/or sulfur atoms and/or one or more substituted or unsubstituted imino groups is preferably vinyl, 2-propenyl, 3-butenyl, cis-2-butenyl, trans-2-butenyl or $C_mF_{2(m-a)-(1-b)}H_{2a-b}$ where $m \leq 30$, $0 \leq a \leq m$ and b=0 or 1.

$C_6$-$C_{12}$-Aryl optionally substituted by functional groups, aryl, alkyl, aryloxy, alkoxy, halogen, hetero atoms and/or heterocyclic radicals is preferably phenyl, tolyl, xylyl, α-naphthyl, β-naphthyl, 4-diphenylyl, chlorophenyl, dichlorophenyl, trichlorophenyl, di-fluorophenyl, methylphenyl, dimethylphenyl, trimethyl-phenyl, ethylphenyl, diethylphenyl, iso-propylphenyl, tert-butylphenyl, dodecylphenyl, methoxyphenyl, di-methoxyphenyl, ethoxyphenyl, hexyloxyphenyl, methyl-naphthyl, isopropylnaphthyl, chloronaphthyl, ethoxy-naphthyl, 2,6-dimethylphenyl, 2,4,6-trimethylphenyl, 2,6-dimethoxyphenyl, 2,6-dichlorophenyl, 4-bromophenyl, 2-nitrophenyl, 4-nitrophenyl, 2,4-dinitrophenyl, 2,6-dinitrophenyl, 4-dimethylaminophenyl, 4-acetylphenyl, methoxyethylphenyl, ethoxymethylphenyl, methylthio-phenyl, isopropylthiophenyl or tert-butylthiophenyl or $C_6F_{(5-a)}H_a$ where $0 \leq a \leq 5$.

$C_5$-$C_{12}$-Cycloalkyl optionally substituted by functional groups, aryl, alkyl, aryloxy, alkoxy, halogen, hetero atoms and/or heterocyclic radicals is preferably cyclopentyl, cyclohexyl, cyclooctyl, cyclododecyl, methylcyclopentyl, dimethylcyclopentyl, methylcyclo-hexyl, dimethylcyclohexyl, diethylcyclohexyl, butylcyclohexyl, methoxycyclohexyl, dimethoxycyclo-hexyl, diethoxycyclohexyl, butylthiocyclohexyl, chlorocyclohexyl, dichlorocyclohexyl, dichlorocyclopentyl, $C_mF_{2(m-1)-(1-b)}H_{2a-b}$ where $m \leq 30$, $0 \leq a \leq m$ and b=0 or 1 and a saturated or unsaturated bicyclic system, such as e.g. norbornyl or norbornenyl.

$C_5$-$C_{12}$-Cycloalkenyl optionally substituted by functional groups, aryl, alkyl, aryloxy, alkoxy, halogen, hetero atoms and/or heterocyclic radicals is preferably 3-cyclopentenyl, 2-cyclohexenyl, 3-cyclohexenyl, 2,5-cyclohexadienyl or $C_nF_{2(m-a)-3(1-b)}H_{2a-3}b$ where $m \leq 30$, $0 \leq a \leq m$ and b=0 or 1.

A five- to six-membered heterocyclic radical containing oxygen, nitrogen and/or sulfur atoms and optionally substituted by functional groups, aryl, alkyl, aryloxy, alkoxy, halogen, hetero atoms and/or heterocyclic radicals is preferably furyl, thiophenyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl or difluoropyridyl.

If two adjacent radicals together form an unsaturated, saturated or aromatic ring optionally substituted by functional groups, aryl, alkyl, aryloxy, alkoxy, halogen, hetero atoms and/or heterocyclic radicals and optionally interrupted by one or more oxygen and/or sulfur atoms and or one or more substituted or unsubstituted imino groups, this is preferably 1,3-propylene, 1,4-butylene, 1,5-pentylene, 2-oxa-1,3-propylene, 1-oxa-1,3-propylene, 2-oxa-1,3-propylene, 1-oxa-1, 3-propenylene, 3-oxa-1,5-pentylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

If the abovementioned radicals contain oxygen and/or sulfur atoms and/or substituted or unsubstituted imino groups, the number of oxygen and/or sulfur atoms and/or imino groups is not limited. As a rule, it is not more than 5 in the radical, preferably not more than 4 and very particularly preferably not more than 3.

If the abovementioned radicals contain hetero atoms, there is as a rule at least one carbon atom, preferably at least two carbon atoms between two hetero atoms.

Particularly preferably, the radicals $R^1$ to $R^9$ independently of one another represent
hydrogen;
unbranched or branched $C_1$-$C_{18}$-alkyl having a total of 1 to 20 carbon atoms which is unsubstituted or substituted once to several times by hydroxyl, halogen, phenyl, cyano, $C_1$-$C_6$-alkoxycarbonyl and/or $SO_3H$, such as, for example, methyl, ethyl, 1-propyl, 2-propyl, 1-butyl, 2-butyl, 2-methyl-1-propyl, 2-methyl-2-propyl, 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, 1-heptyl, 1-octyl, 1-nonyl, 1-decyl, 1-undecyl, 1-dodecyl, 1-tetradecyl, 1-hexadecyl, 1-octadecyl, 2-hydroxy-ethyl, benzyl, 3-phenylpropyl, 2-cyanoethyl, 2-(methoxycarbonyl)-ethyl, 2-(ethoxycarbonyl)-ethyl, 2-(n-butoxycarbonyl)-ethyl, trifluoromethyl, di-fluoromethyl, fluoromethyl, pentafluoroethyl, heptafluoropropyl, heptafluoroisopropyl, nonafluorobutyl, nonafluoroisobutyl, undecylfluoro-pentyl, undecylfluoroisopentyl, 6-hydroxyhexyl and propylsulfonic acid;
glycols, butylene glycols and oligomers thereof having 1 to 100 units and a hydrogen as a $C_1$- to $C_8$-alkyl as the end group, such as, for example, $R^AO$—$(CHR^B$—$CH_2$—$O)_m$—$CHR^B$—$CH_2$— or $RAO$—$(CH_2CH_2CH_2CH_2O)_{m-1}CH_2CH_2CH_2CH_2O$— where $R^A$ and $R^B$ are preferably hydrogen, methyl or ethyl and n is preferably 0 to 3, in particular 3-oxabutyl, 3-oxapentyl, 3,6-dioxaheptyl, 3,6-dioxaoctyl, 3,6,9-trioxadecyl, 3,6,9-trioxaundecyl, 3,6,9,12-tetraoxamidecyl and 3,6,9,12-tetraoxatetradecyl;

vinyl; and allyl

N,N-di-$C_1$-$C_6$-alkylamino, such as, for example, N,N-dimethylamino and N,N-diethylamino.

Very particularly preferably, the radicals $R^1$ to $R^9$ independently of one another represent hydrogen or $C_1$-$C_{18}$-alkyl, such as, for example, methyl, ethyl, 1-butyl, 1-pentyl, 1-hexyl, 1-heptyl or 1-octyl, phenyl, 2-hydroxyethyl, 2-cyanoethyl, 2-(methoxycarbonyl)ethyl, 2-(ethoxycarbonyl)ethyl, 2-(n-butoxycarbonyl)ethyl, N,N-dimethylamino, N,N-diethylamino, chlorine and $CH_3O—(CH_2CH_2O)_m—CH_2CH_2—$ and $CH_3CH_2O—(CH_2CH_2O)_m—CH_2CH_2—$ where m is 0 to 3.

Pyridinium ions (IIIa) which are very particularly preferably employed are those in which one of the radicals $R^1$ to $R^5$ is methyl, ethyl or chlorine and the remaining radicals $R^1$ to $R^5$ are hydrogen;

$R^3$ is dimethylamino and the remaining radicals $R^1$, $R^2$, $R^4$ and $R^5$ are hydrogen;

all the radicals $R^1$ to $R^5$ are hydrogen;

$R^2$ is carboxyl or carboxamide and the remaining radicals $R^1$, $R^2$, $R^4$ and $R^5$ are hydrogen; or $R^1$ and $R^2$ or $R^2$ and $R^3$ are 1,4-buta-1,3-dienylene and the remaining radicals $R^1$, $R^2$, $R^4$ and $R^5$ are hydrogen;

and in particular those in which $R^1$ to $R^5$ are hydrogen; or one of the radicals $R^1$ to $R^5$ is methyl or ethyl and the remaining radicals $R^1$ to $R^5$ are hydrogen.

Very particularly preferred pyridinium ions (IIIa) which may be mentioned are 1-methylpyridinium, 1-ethylpyridinium, 1-(1-butyl)-pyridinium, 1-(1-hexyl)-pyridinium, 1-(1-octyl)-pyridinium, 1-(1-dodecyl)-pyridinium, 1-(1-tetradecyl)-pyridinium, 1-(1-hexa-decyl)-pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methyl-pyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethylpyridinium and 1-(1-octyl)-2-methyl-3-ethylpyridinium, 1-(1-dodecyl)-2-methyl-3-ethylpyridinium, 1-(1-tetradecyl)-2-methyl-3-ethylpyridinium and 1-(1-hexadecyl)-2-methyl-3-ethylpyridinium.

Pyridazinium ions (IIIb) which are very particularly preferably employed are those in which $R^1$ to $R^4$ are hydrogen; or one of the radicals $R^1$ to $R^4$ is methyl or ethyl and the remaining radicals $R^1$ to $R^4$ are hydrogen.

Pyrimidinium ions (IIIc) which are very particularly preferably employed are those in which $R^1$ is hydrogen, methyl or ethyl and $R^2$ to $R^4$ independently of one another are hydrogen or methyl; or $R^1$ is hydrogen, methyl or ethyl, $R^2$ and $R^4$ are methyl and $R^3$ is hydrogen.

Pyrazinium ions (IIId) which are very particularly preferably employed are those in which $R^1$ is hydrogen, methyl or ethyl and $R^2$ to $R^4$ independently of one another are hydrogen or methyl;

$R^1$ is hydrogen, methyl or ethyl, $R^2$ and $R^4$ are methyl and $R^3$ is hydrogen;

$R^1$ to $R^4$ are methyl; or $R^1$ to $R^4$ are methyl hydrogen.

Imidazolium ions (IIIe) which are very particularly preferably employed are those in which $R^1$ is hydrogen, methyl, ethyl, 1-propyl, 1-butyl, 1-pentyl, 1-hexyl, 1-octyl, allyl, 2-hydroxyethyl or 2-cyanoethyl and $R^2$ to $R^4$ independently of one another are hydrogen, methyl or ethyl.

Very particularly preferred imidazolium ions (IIIe) which may be mentioned are 1-methylimidazolium, 1-ethylimidazolium, 1-(1-butyl)-imidazolium, 1-(1-octyl)-imidazolium, 1-(1-dodecyl)-imidazolium, 1-(1-tetra-decyl)-imidazolium, 1-(1-hexadecyl)-imidazolium, 1,3-dimethylimidazolium, 1-ethyl-3-methylimidazolium, 1-(1-butyl)-3-methylimidazolium, 1-(1-butyl)-3-ethyl-imidazolium, 1-(1-hexyl)-3-methylimidazolium, 1-(1-hexyl)-3-ethylimidazolium, 1-(1-hexyl)-3-butyl-illidazolium, 1-(1-octyl)-3-methylimidazolium, 1-(1-octyl)-3-ethylimidazolium, 1-(1-octyl)-3-butyl-imidazolium, 1-(1-dodecyl)-3-methylimidazolium, 1-(1-dodecyl)-3-ethylimidazolium, 1-(1-dodecyl)-3-butyl-imidazolium, 1-(1-dodecyl)-3-octyl-imidazolium, 1-(1-tetradecyl)-3-methylimidazolium, 1-(1-tetradecyl)-3-ethylimidazolium, 1-(1-tetradecyl)-3-butylimidazolium, 1-(1-tetradecyl)-3-octylimidazolium, 1-(1-hexadecyl)-3-methylimidazolium, 1-(1-hexadecyl)-3-ethylimidazolium, 1-(1-hexadecyl)-3-butylimidazolium, 1-(1-hexadecyl)-3-octylimidazolium, 1,2-dimethylimidazolium, 1,2,3-tri-methylimidazolium, 1-ethyl-2,3-dimethylimidazolium, 1-(1-butyl)-2,3-dimethylimidazolium, 1-(1-hexyl)-2,3-di-methylimidazolium, 1-(1-octyl)-2,3-dimethylimidazolium, 1,4-dimethylimidazolium, 1,3,4-trimethylimidazolium, 1,4-dimethyl-3-ethylimidazolium, 3-butylimidazolium, 1,4-dimethyl-3-octylimidazolium, 1,4,5-trimethyl-imidazolium, 1,3,4,5-tetramethylimidazolium, 1,4,5-trimethyl-3-ethylimidazolium, 1,4,5-trimethyl-3-butyl-imidazolium and 1,4,5-trimethyl-3-octylimidazolium.

Pyrazolium ions (IIIf), (IIIg) or (IIIg') which are very particularly preferably employed are those in which $R^1$ is hydrogen, methyl or ethyl and $R^2$ to $R^4$ independently of one another are hydrogen or methyl.

Pyrazolium ions (IIIh) which are very particularly preferably employed are those in which $R^1$ to $R^4$ independently of one another are hydrogen or methyl.

1-Pyrazolinium ions (IIII) which are very particularly preferably employed are those in which $R^1$ to $R^6$ independently of one another are hydrogen or methyl.

2-Pyrazolinium ions (IIIj) or (IIIj') which are very particularly preferably employed are those in which $R^1$ is hydrogen, methyl or phenyl and $R^2$ to $R^6$ independently of one another are hydrogen or methyl.

3-Pyrazolinium ions (IIIk) or (IIIk') which are very particularly preferably employed are those in which $R^1$ and $R^2$ independently of one another are hydrogen, methyl, ethyl or phenyl and $R^3$ to $R^6$ independently of one another are hydrogen or methyl.

Imidazolinium ions (IIII) which are very particularly preferably employed are those in which $R^1$ and $R^2$ independently of one another are hydrogen, methyl, ethyl, 1-butyl or phenyl, $R^3$ and $R^4$ independently of one another are hydrogen, methyl or ethyl and $R^5$ and $R^6$ independently of one another are hydrogen or methyl.

Imidazolinium ions (IIIm) or (IIIm') which are very particularly preferably employed are those in which
$R^1$ and $R^2$ independently of one another are hydrogen, methyl or ethyl and $R^3$ to $R^6$ independently of one another are hydrogen or methyl.

Imidazolinium ions (IIIn) or (IIIn') which are very particularly preferably employed are those in which
$R^1$ to $R^3$ independently of one another are hydrogen, methyl or ethyl and $R^4$ to $R^6$ independently of one another are hydrogen or methyl.

Thiazolium ions (IIIo) or (IIIo') and oxazolium ions (IIIp) which are very particularly preferably employed are those in which
$R^1$ is hydrogen, methyl, ethyl or phenyl and $R^2$ and $R^3$ independently of one another are hydrogen or methyl.

1,2,4-Triazolium ions (IIIq), (IIIq') or (IIIq") which are very particularly preferably employed are those in which
$R^1$ and $R^2$ independently of one another are hydrogen, methyl, ethyl or phenyl and $R^3$ is hydrogen, methyl or phenyl.

1,2,3-Triazolium ions (IIIr), (IIIr') or (IIIr") which are very particularly preferably employed are those in which
$R^1$ is hydrogen, methyl or ethyl and $R^2$ and $R^3$ independently of one another are hydrogen or methyl, or $R^2$ and $R^3$ together are 1,4-buta-1,3-dienylene.

Pyrrolidinium ions (IIIs) which are very particularly preferably employed are those in which
$R^1$ is hydrogen, methyl, ethyl or phenyl and $R^2$ to $R^9$ independently of one another are hydrogen or methyl.

Imidazolidinium ions (IIIt) which are very particularly preferably employed are those in which
$R^1$ and $R^4$ independently of one another are hydrogen, methyl, ethyl or phenyl and $R^2$ and $R^3$ and $R^5$ to $R^8$ independently of one another are hydrogen or methyl.

Ammonium ions (IIIu) which are very particularly preferably employed are those in which
$R^1$ to $R^3$ independently of one another are $C_1$-$C_{18}$-alkyl; or
$R^1$ and $R^2$ together are 1,5-pentylene or 3-oxa-1,5-pentylene and $R^3$ is $C_1$-$C_{18}$-alkyl, 2-hydroxyethyl or 2-cyanoethyl.

Very particularly preferably ammonium ions (IIIu) which may be mentioned are methyl-tri-(1-butyl)-ammonium, N,N-dimethylpiperidiilum and N,N,-dimethylmorpholinium. Examples of the tertiary amines from which the quaternary ammonium ions of the general formula (IIIu) are derived by quaternization with the radicals R mentioned are diethyl-n-butylamine, diethyl-tert-butylamine, diethyl-n-pentylamine, diethylhexylamine, diethyloctylamine, diethyl-(2-ethylhexyl)-amine, di-n-propylbutylamine, di-n-propyl-n-pentylamine, di-n-propylhexylamine, di-n-propyloctylamine, di-n-propyl-(2-ethylhexyl)-amine, diisopropylethylamine, diiso-propyl-n-propylamine, diisopropylbutylamine, diiso-propylpentylamine, diisopropylhexylamine, diiso-propyloctylamine, diisopropyl-(2-ethylhexyl)-amine, di-n-butylethylamine, di-n-butyl-n-propylamine, di-n-butyl-n-pentylamine, di-n-butylhexylamine, di-n-butyl-octylamine, di-n-butyl-(2-ethylhexyl)-amine, N-n-butyl-pyrrolidine, N-sec-butylpyrrolidine, N-tert-butyl-pyrrolidine, N-n-pentylpyrrolidine, N,N-dimethyl-cyclohexylamine, N,N-diethylcyclohexylamine, N,N-di-n-butylcyclohexylamine, N-n-propylpiperidine, N-iso-propylpiperidine, N-n-butylpiperidine, N-sec-butyl-piperidine, N-tert-butylpiperidine, N-n-pentyl-piperidine, N-n-butylmorpholine, N-sec-butylmorpholine, N-tert-butylmorpholine, N-n-pentylmorpholine, N-benzyl-N-ethylaniline, N-benzyl-N-n-propylaniline, N-benzyl-N-isopropylaniline, N-benzyl-N-n-butylaniline, N,N-dimethyl-p-toluidine, N,N-diethyl-p-toluidine, N,N-di-n-butyl-p-toluidine, diethylbenzylamine, di-n-propyl-benzylamine, di-n-butylbenzylamine, diethylphenylamine, di-n-propylphenylamine and di-n-butylphenylamine.

Preferred tertiary amines are diisopropylethylamine, diethyl-tert-butylamine, diisopropylbutylamine, di-n-butyl-n-pentylamine, N,N-di-n-butylcyclohexylamine and tertiary amines of pentyl isomers.

Particularly preferred tertiary amines are di-n-butyl-n-pentylamine and tertiary amines of pentyl isomers. A further preferred tertiary amine, which has three identical radicals, is triallylamine.

Guanidinium ions (IIIv) which are very particularly preferably employed are those in which
$R^1$ to $R^5$ are methyl A very particularly preferred guanidinium ion (IIIv) which may be mentioned is N,N,N',N',N",N"-hexamethylguanidinium.

Cholinium ions (IIIw) which are very particularly preferably employed are those in which
$R^1$ and $R^2$ independently of one another are methyl, ethyl, 1-butyl or 1-octyl and $R^3$ is hydrogen, methyl, ethyl, acetyl, —$SO_2OH$ or —$PO(OH)_2$;
$R^1$ is methyl, ethyl, 1-butyl or 1-octyl, $R^2$ is a —$CH_2$—$CH_2$—$OR^4$ group and $R^3$ and $R^4$ independently of one another are hydrogen, methyl, ethyl, acetyl, —$SO_2OH$ or —$PO(OH)_2$; or
$R^1$ is a —$CH_2$—$CH_2OR^4$ group, $R^2$ is a —$CH_2$—$CH_2$—$OR^5$ group and $R^3$ to $R^5$ independently of one another are hydrogen, methyl, ethyl, acetyl, —$SO_2OH$ or —$PO(OH)_2$.

Particularly preferred cholinium ions (IIIw) are those in which $R^3$ is chosen from hydrogen, methyl, ethyl, acetyl, 5-methoxy-3-oxa-pentyl, 8-methoxy-3,6-dioxa-octyl, 11-methoxy-3,6,9-trioxa-undecyl, 7-methoxy-4-oxa-heptyl, 11-methoxy-4,8-dioxa-undecyl, 15-methoxy-4,8,12-trioxa-pentadecyl, 9-methoxy-5-oxa-nonyl, 14-methoxy-5,10-oxa-tetradecyl, 5-ethoxy-3-oxa-pentyl, 8-ethoxy-3,6-dioxa-octyl, 11-ethoxy-3,6,9-trioxa-undecyl, 7-ethoxy-4-oxa-heptyl, 11-ethoxy-4,8-dioxa-undecyl, 15-ethoxy-4,8,12-trioxa-pentadecyl, 9-ethoxy-5-oxa-nonyl, or 14-ethoxy-5,10-oxa-tetradecyl.

Very particularly preferred cholinium ions (IIIw) which may be mentioned are trimethyl-2-hydroxyethylammonium, dimethyl-bis-2-hydroxyethylammonium or methyl-tris-2-hydroxyethylammonium.

Phosphonium ions (IIIx) which are very particularly preferably employed are those in which
$R^1$ to $R^3$ independently of one another are $C_1$-$C_{18}$-alkyl, in particular butyl, isobutyl, 1-hexyl or 1-octyl.

Among the abovementioned heterocyclic cations, the pyridinium ions, pyrazolinium and pyrazolium ions and the imidazolinium and imidazolium ions are preferred. Ammonium and cholinium ions are furthermore preferred.

Particularly preferred ions are 1-methylpyridinium, 1-ethylpyridinium, 1-(1-butyl)-pyridinium, 1-(1-hexyl)-pyridinium, 1-(1-octyl)-pyridinium, 1-(1-dodecyl)-pyridinium, 1-(1-tetradecyl)-pyridinium, 1-(1-hexadecyl)-pyridinium, 1,2-dimethylpyridinium, 1-ethyl-2-methylpyridinium, 1-(1-butyl)-2-methylpyridinium, 1-(1-hexyl)-2-methylpyridinium, 1-(1-octyl)-2-methylpyridinium, 1-(1-dodecyl)-2-methylpyridinium, 1-(1-tetradecyl)-2-methylpyridinium, 1-(1-hexadecyl)-2-methylpyridinium, 1-methyl-2-ethylpyridinium, 1,2-diethylpyridinium, 1-(1-butyl)-2-ethylpyridinium, 1-(1-hexyl)-2-ethylpyridinium, 1-(1-octyl)-2-ethylpyridinium, 1-(1-dodecyl)-2-ethylpyridinium, 1-(1-tetradecyl)-2-ethylpyridinium, 1-(1-hexadecyl)-2-ethylpyridinium, 1,2-dimethyl-5-ethylpyridinium, 1,5-diethyl-2-methylpyridinium, 1-(1-butyl)-2-methyl-3-ethylpyridinium, 1-(1-hexyl)-2-methyl-3-ethyl-pyridinium, 1-(1-octyl)-2-methyl-3-ethylpyridinium, 1-(1-dodecyl)-2-methyl-3-ethylpyridinium, 1-(1-tetra-decyl)-2-methyl-3-ethylpyridinium, 1-(1-hexadecyl)-2-methyl-3-ethylpyridinium, 1-methylimidazolium, 1-ethylimidazolium, 1-(1-butyl)-imidazolium, 1-(1-octyl)-imidazolium, 1-(1-dodecyl)-imidazolium, 1-(1-tetradecyl)-imidazolium, 1-(1-hexadecyl)-imidazolium, 1,3-dimethylimidazolium, 1-ethyl-3-methylimidazolium, 1-(1-butyl)-3-methylimidazolium, 1-(1-hexyl)-3-methylimidazolium, 1-(1-octyl)-3-methylimidazolium, 1-(1-dodecyl)-3-methylimidazolium, 1-(1-tetradecyl)-3-methylimidazolium, 1-(1-hexadecyl)-3-methylimidazolium, 1,2-dimethylimidazolium, 1,2,3-trimethylimidazolium, 1-ethyl-2,3-dimethylimidazolium, 1-(1-butyl)-2,3-dimethylimidazolium, 1-(1-hexyl)-2,3-dimethylimidazolium and 1-(1-octyl)-2,3-dimethylimidazolium, 1,4-di-methylimidazolium, 1,3,4-trimethylimidazolium, 1,4-dimethyl-3-ethylimidazolium, 3-butylimidazolium, 1,4-dimethyl-3-octylimidazolium, 1,4,5-trimethyl-imidazolium, 1,3,4,5-tetramethylimidazolium, 1,4,5-trimethyl-3-ethylimidazolium, 1,4,5-trimethyl-3-butyl-imidazolium, 1,4,5-trimethyl-3-octylimidazolium, tri-methyl-2-hydroxyethylammonium, dimethyl-bis-2-hydroxyethylammonium and methyl-tris-2-hydroxyethylammonium.

In principle, all anions can be employed as anions.

The anion $[Y]^{n-}$ of the ionic liquid is chosen, for example, from the group consisting of halides and halogen-containing compounds of the formula:

$F^-$, $Cl^-$, $Br^-$, $I^-$, $BF_4^-$, $PF_6^-$, $CF_3SO_3^-$, $(CF_3SO_3)_2N^-$, $CF_3CO_2^-$, $CCl_3CO_2^-$, $CN^-$, $SCN^-$, $OCN^-$ the group consisting of sulfates, sulfites and sulfonates of the general formula:

$SO_4^{2-}$, $HSO_4^-$, $SO_3^{2-}$, $HSO_3^-$, $R^aOSO_3^-$, $R^aSO_3^-$, the group consisting of phosphates of the general formula $PO_4^{3-}$, $HPO_4^{2-}$, $H_2PO_4^-$, $R^aPO_4^{2-}$, $HR^aPO_4^-$, $R^aR^bPO_4^-$ the group consisting of phosphonates and phosphinates of the general formula:

$R^aHPO_3^-$, $R^aR^bPO_2^-$, $R^aR^bPO_3$ the group consisting of phosphites of the general formula:

$PO_3^{3-}$, $HPO_3^{2-}$, $H_2PO_3^-$, $R^aPO_3^{2-}$, $R^aHPO_3^-$, $R^aR^bPO_3^-$ the group consisting of phosphonites and phosphinites of the general formula:

$R^aR^bPO_2^-$, $R^aHPO_2^-$, $R^aR^bPO^-$, $R^aHPO^-$ the group consisting of carboxylic acids of the general formula:

$R^aCOO^-$ the group consisting of borates of the general formula:

$BO_3^{3-}$, $HBO_3^{2-}$, $H_2BO_3^-$, $R^aR^bBO_3^-$, $R^aHBO_3^-$, $R^aBO_3^{2-}$, $B(OR^a)(OR^b)(OR^c)(OR^d)^-$, $B(HSO_4)^-$, $B(R^aSO_4)^-$ the group consisting of boronates of the general formula:

$R^aBO_2^{2-}$, $R^aR^bBO^-$ the group consisting of silicates and silicic acid esters of the general formula:

$SiO_4^{4-}$, $HSiO_4^{3-}$, $H_2SiO_4^{2-}$, $H_3SiO_4^-$, $R^aSiO_4^{3-}$, $R^aR^bSiO_4^{2-}$, $R^aR^bR^cSiO_4^-$, $HR^aSiO_4^{2-}$, $H_2R^aSiO_4^-$, $HR^aR^bSiO_4^-$ the group consisting of alkyl- or arylsilane salts of the general formula:

$R^aSiO_3^{3-}$, $R^aR^bSiO_2^{2-}$, $R^aR^bR^cSiO^-$, $R^aR^bR^cSiO_3^-$, $R^aR^bR^cSiO_2^-$, $R^aR^bSiO_3^{2-}$ the group consisting of carboxylic acid imides, bis(sulfonyl)imides and sulfonylimides of the general formula:

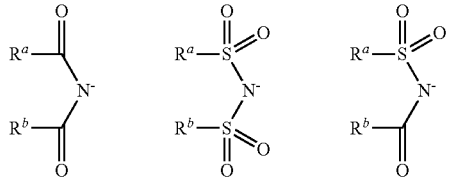

the groups consisting of methides of the general formula:

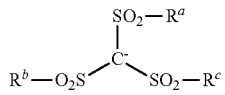

In these formulae, $R^a$, $R^b$, $R^c$ and $R^d$ independently of one another each denote hydrogen, $C_1$-$C_{30}$-alkyl, $C_2$-$C_{18}$-alkyl, optionally interrupted by one or more non-adjacent oxygen and/or sulfur atoms and/or one or more substituted or unsubstituted imino groups, $C_1$-$C_{14}$-aryl, $C_5$-$C_{12}$-cycloalkyl or a five- to six-membered heterocyclic radical containing oxygen, nitrogen and/or sulfur atoms, wherein two of them together can form an unsaturated, saturated or aromatic ring optionally interrupted by one or more oxygen and/or sulfur atoms and/or one or more unsubstituted or substituted imino groups, and wherein the radicals mentioned can each additionally be substituted by functional groups, aryl, alkyl, aryloxy, alkoxy, halogen, hetero atoms and/or heterocyclic radicals.

In these formulae, $C_1$-$C_{18}$-alkyl optionally substituted by functional groups, aryl, alkyl, aryloxy, alkoxy, halogen, hetero atoms and/or heterocyclic radicals is, for example, methyl, ethyl, propyl, isopropyl, n-butyl, sec-butyl, tert-butyl, pentyl hexyl, heptyl, octyl, 2-ethylhexyl, 2,4,4-trimethylpentyl, decyl, dodecyl, tetradecyl, heptadecyl, octadecyl, 1,1-dimethylpropyl, 1,1-dimethylbutyl, 1,1,3,3-tetramethylbutyl, benzyl, 1-phenylethyl, α,α-dimethylbenzyl, benzhydryl, p-tolylmethyl, 1-(p-butylphenyl)-ethyl, p-chlorobenzyl, 2,4-dichlorobenzyl, p-methoxybenzyl, m-ethoxybenzyl, 2-cyanoethyl, 2-cyanopropyl, 2-methoxycarbonylethyl, 2-ethoxycarbonylethyl, 2-butoxycarbonylpropyl, 1,2-di-(methoxycarbonyl)-ethyl, 2-methoxyethyl, 2-ethoxyethyl, 2-butoxyethyl, diethoxymethyl, diethoxyethyl, 1,3-dioxolan-2-yl, 1,3-dioxan-2-yl, 2-methyl-1,3-dioxolan-2-yl, 4-methyl-1,3-dioxolan-2-yl, 2-isopropoxyethyl, 2-butoxypropyl, 2-octyloxyethyl, chloromethyl, tri-chloromethyl, trifluoromethyl, 1,1-dimethyl-2-chloro-ethyl, 2-methoxyisopropyl, 2-ethoxyethyl, butylthio-methyl, 2-dodecylthioethyl, 2-phenylthioethyl, 2,2,2-trifluoroethyl, 2-hydroxyethyl, 2-hydroxypropyl, 3-hydroxypropyl, 4-hydroxybutyl, 6-hydroxyhexyl, 2-aminoethyl, 2-aminopropyl, 4-aminobutyl, 6-aminohexyl, 2-methylaminoethyl, 2-methylaminopropyl, 3-methylamino-propyl, 4-methylaminobutyl, 6-methylaminohexyl, 2-dimethylaminoethyl, 2-dimethylaminopropyl, 3-dimethylaminopropyl, 4-dimethylaminobutyl, 6-dimethylaminohexyl, 2-hydroxy-2,2-dimethylethyl, 2-phenoxy-ethyl, 2-phenoxypropyl, 3-phenoxypropyl, 4-phenoxy-butyl, 6-phenoxyhexyl, 2-methoxyethyl, 2-methoxypropyl, 3-methoxypropyl, 4-methoxybutyl, 6-methoxyhexyl, 2-ethoxyethyl, 2-ethoxypropyl, 3-ethoxypropyl, 4-ethoxybutyl or 6-ethoxyhexyl.

$C_2$-$C_{18}$-Alkyl optionally interrupted by one or more non-adjacent oxygen and/or sulfur atoms and/or one or more substituted or unsubstituted imino groups is, for example, 5-hydroxy-3-oxapentyl, 8-hydroxy-3,6-dioxa-octyl, 11-hydroxy-3,6,9-trioxaundecyl, 7-hydroxy-4-oxa-heptyl, 11-hydroxy-4,8-dioxaundecyl, 15-hydroxy-4,8,12-trioxapentadecyl, 9-hydroxy-5-oxanonyl, 14-hydroxy-5,10-oxatetradecyl, 5-methoxy-3-oxapentyl, 8-methoxy-3,6-dioxaoctyl, 11-methoxy-3,6,9-trioxaundecyl, 7-methoxy-4-oxaheptyl, 11-methoxy-4,8-dioxaundecyl, 15-methoxy-4,8,12-trioxapentadecyl, 9-methoxy-5-oxanonyl, 14-methoxy-5,10-oxatetradecyl, 5-ethoxy-3-oxapentyl, 8-ethoxy-3,6-dioxaoctyl, 11-ethoxy-3,6,9-trioxaundecyl, 7-ethoxy-4-oxaheptyl, 11-ethoxy-4,8-dioxaundecyl, 15-ethoxy-4,8,12-trioxapentadecyl, 9-ethoxy-5-oxanonyl or 14-ethoxy-5,10 oxatetradecyl.

If two radicals form a ring, these radicals together can denote, for example as a fused unit, 1,3-propylene, 1,4-butylene, 2-oxa-1,3-propylene, 1-oxa-1,3-propylene, 2-oxa-1,3-propenylene, 1-aza-1,3-propenylene, 1-$C_1$-$C_4$-alkyl-1-aza-1,3-propenylene, 1,4-buta-1,3-dienylene, 1-aza-1,4-buta-1,3-dienylene or 2-aza-1,4-buta-1,3-dienylene.

The number of non-adjacent oxygen and/or sulfur atoms and/or imino groups is in principle not limited, or is limited automatically by the size of the radical or of the ring unit. As a rule, it is not more than 5 in the particular radical, preferably not more than 4 or very particularly preferably not more than 3. There is furthermore as a rule at least one, preferably at least two carbon atom(s) between two hetero atoms.

Substituted and unsubstituted imino groups can be, for example, imino, methylimino, isopropylimino, n-butylimino or tert-butylimino.

The term "functional groups" is to be understood as meaning, for example, the following: carboxyl, carboxamide, hydroxyl, di-($C_1$-$C_4$-alkyl)-amino, $C_1$-$C_4$-alkoxycarbonyl, cyano or $C_1C_4$-alkoxy. In this context, $C_1$ to $C_4$-alkyl is methyl, ethyl, propyl, isopropyl, n-butyl, sec-butyl or tert-butyl.

$C_6$-$C_{14}$-Aryl optionally substituted by functional groups, aryl, alkyl, aryloxy, alkoxy, halogen, hetero atoms and/or heterocyclic radicals is, for example, phenyl, tolyl, xylyl, α-naphthyl, β-naphthyl, 4-diphenylyl, chlorophenyl, dichlorophenyl, trichlorophenyl, di-fluorophenyl, methylphenyl, dimethylphenyl, trimethyl-phenyl, ethylphenyl, diethylphenyl, isopropylphenyl, tert-butylphenyl, dodecylphenyl, methoxyphenyl, di-methoxyphenyl, ethoxyphenyl, hexyloxyphenyl, methyl-naphthyl, isopropylnaphthyl, chloronaphthyl, ethoxy-naphthyl, 2,6-dimethylphenyl, 2,4,6-trimethylphenyl, 2,6-dimethoxyphenyl, 2,6-dichlorophenyl, 4-bromophenyl, 2- or 4-nitrophenyl, 2,4- or 2,6-dinitrophenyl, 4-dimethylaminophenyl, 4-acetylphenyl, methoxyethylphenyl or ethoxymethylphenyl.

$C_5$-$C_{12}$-Cycloalkyl optionally substituted by functional groups, aryl, alkyl, aryloxy, halogen, hetero atoms and/or heterocyclic radicals is, for example, cyclopentyl, cyclohexyl, cyclooctyl, cyclododecyl, methylcyclopentyl, dimethylcyclopentyl, methylcyclo-hexyl, dimethylcyclohexyl, diethylcyclohexyl, butyl-cyclohexyl, methoxycyclohexyl, dimethoxycyclohexyl diethoxycyclohexyl, butylthiocyclohexyl, chlorocyclo-hexyl, dichlorocyclohexyl, dichloiocyclopentyl and a saturated or unsaturated bicyclic system, such as norbornyl or norbornenyl.

A five- to six-membered heterocyclic radical containing oxygen, nitrogen and/or sulfur atoms is, for example, furyl, thiophenyl, pyrryl, pyridyl, indolyl, benzoxazolyl, dioxolyl, dioxyl, benzimidazolyl, benzothiazolyl, dimethylpyridyl, methylquinolyl, dimethylpyrryl, methoxyfuryl, dimethoxypyridyl, difluoropyridyl, methylthiophenyl, isopropylthiophenyl or tert-butylthiophenyl.

It goes without saying that the use of a mixture, adjusted in a targeted manner, of various ionic liquids described above can also be advantageously undertaken in the individual case. In the context of the invention, it has been found that ionic liquids with an imidazolium cation in the salt in question are of particular advantage. It is very particularly preferable here for the 1- and 3-position or the 1-, 2- and 3-position of the imidazolium ring to be substituted by a ($C_1$-$C_6$)-alkyl group. It has proved to be of particular advantage if the imidazolium cation is a 1-ethyl-3-methylimidazolium, 1,3-dimethylimidazolium or a 1-butyl-3-methylimidazolium cation.

The cations described above for the ionic liquid are also not substantially limited in respect of the choice of the corresponding anion. It is particularly preferable for the anion to the particular cation to be a halide, perchlorate, pseudohalide, sulfate, in particular hydrogen sulfate, sulfite, sulfonate, phosphate, alkyl-phosphate, in particular the mono- and/or dialkyl-phosphate anion (preferred alkyl group is the methyl, ethyl or propyl group) and/or a carboxylate anion, in particular a $C_1$-$C_6$-carboxylate anion (preferably acetate or propionate anion). It is particularly preferable for the halide ion to be present as the chloride, bromide and/or iodide ion, the pseudohalide ion to be present as the cyanide, thiocyanate and/or cyanate ion and the $C_1$-$C_6$-carboxylate ion to be present as the formate, acetate, propionate, butyrate, hexanoate, maleate, fumarate, oxalate, lactate, pyruvate, methanesulfonate, tosylate and/or alkane-sulfate ion.

For the sake of order, the following advantageous anions are also to be named: $R^a$—$COO^-$, $R^a$—$SO_3^-$, $R^aR^bPO_4^-$ (wherein $R^a$ and $R^b$ have the meaning already described above), which include, in particular, the anions of the formula $(CH_3O)_2PO_2^-$ and $(C_2H_5O)_2PO_2^-$ and the benzoate anion, preferably $(C_2H_5O)_2PO_2^-$ and the benzoate anion.

It is easily possible for the person skilled in the art to employ the particularly suitable ionic liquid for the particular case in which the invention is used. Particularly preferred ionic liquids are: 1-ethyl-3-methylimidazolium acetate, 1,3-dimethylimidazolium acetate, 1-butyl-3-methylimidazolium acetate-, 1-ethyl-3-methylimidazolium chloride, 1-ethyl-3-methyl-imidazolium diethyl-phosphate, 1-methyl-3-methyl-imidazolium dimethyl-phosphate, 1-ethyl-3-methyl-imidazolium formate, 1-ethyl-3-methylimidazolium octanoate, 1,3-diethylimidazolium acetate and 1-ethyl-3-methylimidazolium propionate. Among these, the following are very particularly preferred: 1-ethyl-3-methylimidazolium acetate, 1,3-dimethylimidazolium acetate, 1-butyl-3-methylimidazolium acetate, 1-ethyl-3-methylimidazolium diethyl-phosphate, 1-methyl-3-methylimidazolium dimethyl-phosphate, 1,3-diethyl-imidazolium acetate and 1-ethyl-3-methylimidazolium propionate.

It can readily be seen that there are diverse possibilities for choosing a particularly suitable ionic liquid for the particular intended use, in particular also with respect to the particular anionic and cationic part. Among the large number of possibilities described above, various anions, cations and anion/cation pairs are to be emphasized as preferred in the following:

Anions: $R^aCOO$—, wherein: $R^a$ preferably denotes alkyl, in particular $C_1$-$C_8$-alkyl and very particularly preferably $C_1$-$C_3$-alkyl, or phenyl; phosphate, preferably dialkyl-phosphate, in particular di-($C_1$-$C_3$-alkyl)-phosphate, dimethyl-phosphate, diethyl-phosphate and di-n-propyl-phosphate being particularly preferred; phosphonate, in particular O-alkyl alkyl-phosphonate, O-methyl methyl-phosphonate, O-methyl-ethyl-phosphonate, O-ethyl-methyl-phosphonate and O-ethyl ethyl-phosphonate being particularly preferred.

Cations: Compounds of the formula IIIe already described above, in particular 1-ethyl-3-methylimidazolium (EMIM), 1-butyl-3-methylimidazolium (BMIM), 1-ethyl-2,3-dimethylimidazolium (EMMIM) and 1-butyl-2,3-dimethylimidazolium (BMMIM); compounds of the formula IIIa described above, in particular N-alkyl-pyridinium, particularly preferably N-methylpyridinium, N-ethylpyridinium, N-methyl-2-methylpyridinium, N-methyl-3-methylpyridinium, N-ethyl-2-methylpyridinium and N-ethyl-3-methylpyridinium; compounds of the formula IIIf described above, in particular 1,2,4-trimethylpyrazolium.

The following may be mentioned for a particularly preferred combination of anion+cation among the possibilities presented above: $R^aCOO-$+compounds of the formula IIIe described above and phosphate+compounds of the formula IIIe described above.

It is furthermore to be pointed out that the following descriptions relate to advantageous embodiments of the invention, in particular the compounds described in detail specifically above. If reference is made to a specific ionic liquid in an individual case, it can readily be seen by the person skilled in the art that these statements also apply equally to the further ionic liquids described.

One possible reason for the particular advantage of the anions described above could be that these are particularly potent hydrogen-bonding acceptors and this is a reason for the good dissolving results. All these anions are known as hydrogen-bonding acceptors and participate in an extensive hydrogen bond network. It is left to the person skilled in the art to determine here, with the aid of simple tests, what anions are particularly suitable in the individual case for the particular selected carbohydrate which is to be dissolved and regenerated.

For the purposes of the invention, it is advantageous if the molten ionic liquid has a melting point of from −100 to +150° C., in particular from −30 to +100° C., the range of from −30 to +80° C. being particularly preferred. Ionic liquids having a melting point of more than 100° C. can be employed in particular if thermal degradation of the carbohydrates dissolved therein can be ruled out. In the majority of cases, however, it is advantageous not to exceed this maximum value.

The solution system described above is thus available for dissolving any desired carbohydrates therein and subjecting them to a regeneration, for example in a coagulation medium.

The carbohydrates are preferably in the form of starch, cellulose and/or derivatives of starch and cellulose.

It is preferable for the derivatives to be present as esters or ethers. The esters can be, for example, cellulose acetate and cellulose butyrate, and the ethers can be carboxymethylcellulose, hydroxyethylcellulose and hydroxypropylcellulose.

It is advantageous for the carbohydrate, in particular cellulose, to dissolve in a solution system in which the protic solvent, in particular water, is already present. That is to say, a homogeneous solution with a defined, previously specified and adjusted content of protic solvent, in particular water content, is present. In order to process this solution system which contains the carbohydrate into fibers or similar structures by coagulation, a further protic solvent, for example an alcohol and/or water, is added to this system, which leads to a local precipitation. During the coagulation, a gradient of protic solvent, in particular of water, is present from the coagulation side to the core of the remaining solution. Finally, the entire carbohydrate, in particular cellulose, precipitates out under diffusion control. The desired precipitated material is obtained by this means. This will be discussed in more detail below.

The invention is not subject to any substantial limitation in the quantification of the carbohydrates to be dissolved. Preferably, the starch, the cellulose and/or derivatives thereof are employed in the solution system in an amount of from 1 to 35 wt. %, in particular in an amount of about 5 to 20 wt. %. If the value falls below about 1 wt. %, the desired profitability is not established.

With respect to the quality sought for the regenerated carbohydrate, it is expedient substantially to dissolve the starch, the cellulose and/or derivatives thereof.

This favors an advantageous quality. It is therefore expedient for the dissolving in the solution system to be carried out at about 20 to 150° C., in particular at about 30 to 120° C.

In the regeneration sought for the carbohydrates dissolved in the solution system, for example in a coagulation medium, it is expedient for the viscosity of the solution system containing the carbohydrates to be adjusted in a controlled manner. The zero viscosity of this solution system (measured with a rotary viscometer) is expediently between about 5 and 150,000 Pa·s, in particular between about 10 and 100,000 Pa·s. It is furthermore preferable for the zero viscosity to be between about 5 and 10,000 Pa·s, in particular between about 10 and 2,500 Pa·s, processing of the solution system, for example in an extruder, being particularly advantageous within these margins of the zero viscosity.

It is of particular value for the regeneration of cellulose or derivatives thereof with the aid of the solution system according to the invention if these have an average degree of polymerization of from about 200 to 3,500, in particular from about 300 to 1,500. Advantageous product properties, such as, for example, strength, modulus and rigidity, are achieved by processing of higher molecular weight cellulose (DP greater than 800).

It is of advantage here and also in connection with the other carbohydrates referred to if the solution system obtained is degassed after dissolving of the carbohydrate. This can be effected by stirring and by applying a vacuum.

The invention also has the aim of proposing an advantageous process for the preparation of the solution system containing carbohydrates. This comprises mixing the carbohydrate, in particular cellulose, starch and/or derivatives thereof, with the molten ionic liquid, as defined above, with a sufficient amount of protic solvent or mixture of several protic solvents until the dissolving has been carried out to the required extent, in particular is complete, and in the case of the sole use of water as the protic solvent, this is present in the solution system in an amount of more than 5 wt. %. Regarding the particular embodiments of this quantitative data, reference is made to the above statements.

When the advantageous embodiment of "complete dissolving" is referred to above, this is to be understood as meaning that a complete dissolving is obtained if the dissolving mixture can be filtered through a filter fabric having a mesh width of less than 25 mesh, the filtered solution is clear and the flow properties thereof are structurally viscous, and the solution moreover contains no gel particles and therefore can be further processed in an industrially particularly advantageous manner.

The mixing of the starting constituents of the solution system, containing carbohydrates, is preferably carried out under the action of high shear forces, in particular with the aid of an extruder. A twin-screw extruder has proved to be particularly advantageous here. The dissolving is furthermore promoted by simultaneously irradiating with microwaves during the mixing, and ultrasound has an action in particular. The dissolving of the carbohydrates is promoted by raising the temperature of the solution system. The elevated temperature is expediently about 20 to 150° C., in particular about 30 to 120° C.

It has already been shown above that any desired carbohydrates can advantageously be treated or further processed and regenerated in the context of the invention. The process according to the invention is of particular advantage for regenerating working up of cellulose starting materials. The cellulose starting material is preferably present as fibrous cellulose, in particular wood pulp, linters or paper, and/or in the form of other natural cellulose fibers. Among the natural cellulose fibers, hemp, coconut, jute, bamboo and/or sisal fibers may be emphasized as advantageous. With respect to the optimum quality sought for the regenerated carbohydrate, it has proved to be expedient here not only to take one or more of the preferred measures referred to above, for example the degassing, but to filter the solution system which contains the carbohydrate over a filter before the further processing, in particular with application of pressure or under a vacuum, in order to rule out, for example, any undissolved particles present, and also any microgel formed. In this context, it has been found that it is advantageous if the amount of microgel is less than 2 wt. %. To improve the quality of the produce obtained, it is expedient, as already referred to above, to degas the solution system before the further processing for regeneration of the carbohydrates contained therein, which is expediently carried out while stirring and under a vacuum. There are no specific framework conditions regarding this.

The particular value of the solution system according to the invention which contains the carbohydrates named above lies in the more extensive regenerating processing, especially if carbohydrates are present in the form of starch, cellulose and derivatives of starch and cellulose. This solution system can thus be transferred into a coagulation medium, in particular into a coagulation medium which contains a solvent which does not dissolve the carbohydrates and is miscible with the molten ionic liquid. Any desired shaped articles can be formed by this means. It is of particular advantage if the solution system is subjected to wet spinning, in particular also using an extruder. A non-solvent which is particularly suitable for this purpose is water and/or an alcohol, in particular methanol, ethanol, propanol and butanol, water being particularly preferred. In this context, it is advantageous if the particular non-solvent in the coagulation medium or coagulation medium is more or less identical to the protic non-solvent of the solution system introduced into the coagulation medium or coagulation bath. In other words, it is particularly advantageous if water is contained both in the solution of the carbohydrate and in the coagulation medium. It is also advantageous if the solution system containing the carbohydrates is used as a spinning solution for the production of non-fibrillating fibers.

This is particularly surprising, because the prior art according to WO 2003/029329 has shown that if, for example, water is contained in the solution system in an amount of more than 1 wt. %, this noticeably not only impairs the solubility of the cellulose, but also has an adverse influence on its fibrous structure. The invention has created a particularly advantageous technical teaching against this trend-setting information of WO 2003/029329. The use of water as an essential constituent of the regenerating solution is of particular value under environmental protection conditions, and has advantages in terms of cost. The ionic liquid can be recovered from the aqueous medium without problems, without the water having to be completely removed. The following measures, for example, can be taken during removal of the water or other protic solvents: pervaporation, reverse osmosis, evaporation of the water and/or of the other protic solvents incorporated.

On the basis of the above statements, it is found that the solution system containing carbohydrates can be used particularly advantageously as a spinning solution for the production of non-fibrillating fibers. It is preferable for an air gap spinning unit to be employed in order to obtained staple fibers and continuous fibers of high crystallinity index, for example a crystallinity index CI of more than 0.5.

In order to optimize the ideas according to the invention in the regeneration of carbohydrates, in particular cellulose, it is expedient also to pay attention to the viscosity of the solution system. It is thus advantageous if the solution system containing cellulose has a high viscosity. In the context of the invention, it is expedient to establish a zero viscosity (measured with a rotary viscometer) of between about 5 and 150,000 Pa·s, in particular between 10 and 100,000 Pa·s, the range of from 100 to 60,000 being particularly preferred. It is furthermore preferable for the zero viscosity to be between about 5 and 10,000 Pa·s, in particular between about 10 and 2,500 Pa·s. The content of cellulose in the solution system is preferably between about 5 and 25 wt. %, while the average degree of polymerization is, in particular, up to 3,500, and very particularly preferably should lie between about 300 to 1,500. In individual cases it is particularly advantageous if the minimum value is adjusted to about 350 and the maximum value to about 1,500.

It is indeed not necessary for successful realization of the invention absolutely to incorporate specific additives. However, additives can be added to adjust particular properties of the precipitated material obtained, in particular in the form of filaments or staple fibers of cellulose. The additives, if they are considered, can be employed at various points in the process. They can thus be added to the coagulation medium, the solution system which contains the carbohydrates and/or in a subsequent step, for example in a modification medium. The additives can be, for example, microcapsules, pore-forming agents, plasticizers, matting agents, flameproofing agents, bactericides, crosslinking agents, hydrophobizing agents, antistatics and/or coloring agents. It is advantageous if solely water is used as the precipitating or coagulation agent and no additives are added. It is moreover advantageous in individual cases if an alcohol, a mixture of alcohols or a mixture of alcohol(s) and water is used as the precipitating or coagulation medium. It is then advantageous to add no additives.

In carrying out the regeneration measure, it is particularly expedient to heat the solution system containing carbohydrates before the processing, in particular to about 80 to 120° C., or to adjust the coagulation medium in particular to a temperature of from about 40 to 90° C. This measure results in the advantage that a preferred viscosity of the solution is established and the solvent is advantageously washed out.

The particular advantage of the proposal according to the invention is that the carbohydrates, in particular starch, cellulose and/or derivatives of starch and cellulose, precipitated out in the coagulation bath or medium, in particular water, can be separated off without problems and the liquid phase which remains can be recovered, optionally after partial evaporation, and employed for preparation of the original solution system with incorporation of new carbohydrate to be regenerated. The separating off can be effected, for example, by filtration, centrifugation or other suitable measures.

The invention accordingly has diverse embodiments and has been described comprehensively above with respect to these embodiments. Needless to say, the process product obtained after regeneration of the carbohydrate, in particular in the form of regenerated cellulose fibers, is also to be protected here.

The present invention accordingly also provides spun fibers based on cellulose which are non-fibrillating and are distinguished by a content of sulfur of less than 1 mg/g, in particular less than 0.75 mg/g, and a copper content of less than 20 µg/g, in particular of less than 15 µg/g. It is preferable here for the sulfur content to be less than 0.5 mg/g, in particular less than 0.25 µg/g, and the copper content to be less than 10 µg/g, in particular less than 5 µg/g. The data on the spun fibers according to the invention regarding the sulfur and copper content relate in particular to the non-washed spun fibers emerging from the coagulation bath.

The spun fibers according to the invention are distinguished by an advantageous water retention capacity. This is preferably between about 50 and 300%, in particular between about 65 and 200% (moist weight–dry weight)/dry weight× 100%, according to DIN 53184). They furthermore show an advantageous maximum tensile force elongation. The maximum tensile force according to DIN EN ISO 2062 is at least 6 cN/tex, in particular at least 10 cN/tex. The maximum tensile force elongation according to DIN EN ISO 2062 is preferably at least 4%, in particular at least 6%.

The spun fibers according to the invention, in particular those obtained by wet spinning, are also distinguished in that they are "non-fibrillating". This requires further explanation: The lyocell fibers produced by the NMMO process have a circular to oval fiber cross-section and, in contrast to viscose and modal fibers, have a pronounced fibril structure, which is largely homogeneous over the fiber cross-section. Macrofibrils having a diameter in the range of 0.5 to 1.0 µm are present, these being relevant for the striking wet fibrillation, which is usually troublesome in industry, and pilling. The fibrillation can be classified with the aid of a fibrillating test described below.

8 filaments are separated out of the sample material. The fibers are laid straight on a microscope slide and fixed at the ends with double-sided adhesive tape. The fibers are cut to a length of 2 cm by means of a scalpel on the microscope slide. The 8 fibers are introduced into a cylindrical 20 ml glass vessel (height 50 mm, diameter 30 mm) with 4 ml of demineralized water. The sample glasses are clamped in a suitable shaking thermostat (e.g. from B. Braun) and shaken at 160 rpm for 9 hours. The fibers are then transferred to a microscope slide, embedded in completely demineralized water and provided with a cover glass. The evaluation is carried out with a transmitted-light microscope (e.g. Zeiss Axioplan). The slide is magnified 20-fold without intermediate magnification. The photographs are taken in phase contrast, so that the projecting fibrils can be presented clearly visibly. A distance of 580 µm is measured along the center of the fiber. The individual fibers are now counted only within this measured distance. Those fibrils which are clearly visible at this magnification are to be counted. The measurement operation is carried out on 4 images per sample, each of which originates from a different fiber.

Fibrillation evaluation: 0 to 5 fibrils counted=rating 1; 6 to 10 fibrils counted=rating 2; 11 to 15 fibrils counted=rating 3; 16 to 20 fibrils counted=rating 4; 21 to 25 fibrils counted=rating 5.

According to the wet fibrillation ratings cited by K. Bredereck and F. Hermanutz in Rev. Prog. Color. 35 (2005), 59, cellulose fibers produced by the NMMO process have a rating of 4 or 5, whereas normal viscose and modal have a rating of 1 and are therefore to be classified as non-fibrillating. The high wet fibrillation of the fibers obtained from NMMO is a serious disadvantage in textile finishing processes, such as e.g. in dyeing, and necessitates changed working processes and additional machine measures during processing. The production of fibrillation-free cellulose fibers obtained by the NMMO process is not possible because of the peculiarities of the spinning process (spinning via an air gap) and can be achieved only by a special after-treatment of the fibers. To avoid the tendency of so-called lyocell fibers spun from NMMO solution towards fibrillation, in the fiber after-treatment according to the prior art reactive substances which crosslink cellulose chains are added.

A reduction in fibrillation can accordingly be achieved by chemical crosslinking during after-treatment of fibers which have never dried, and has led to the modified lyocell fiber types Lenzing Lyocell LF (C. Rohrer, P. Retzel and H. Firgo in Man-made Fiber Yearbook (Chem. Fibers Intern.) 2001, 8 (2001) 26 and Tencel A100 (P. Alwin and J. Taylor in Melli- and Textilber., 82 (2001) 196). By introduction of the crosslinking bridges, a significantly lower irreversible cornification, as with standard lyocell fibers, occurs during the first drying. Meanwhile, the fact that the substances employed for crosslinking withstand some of the conditions prevailing in subsequent processes to only a limited extent presents problems for these low-fibrillation directly spun cellulose fibers. Thus, for example, in the case of the dichlorochloromonohydroxytriazine employed as the crosslinking agent, it is known that almost half of the crosslinking agent is split off in the course of a hydrogen peroxide bleaching conventional in industry, so that an increased fibrillation of the fibers is again obtained. It would accordingly be of great advantage if industry could be provided with directly spun, non-fibrillating cellulose fibers.

With the invention it is now possible to dissolve cellulose, which is present in the form of pulp, cotton linters etc., in a solvent suitable for this by means of a suitable dissolving routine—and without prior derivatization—and to obtain spinnable solutions which lead to the porous spun fibers according to the invention which have a wet fibrillation rating of equal to or less than 2 according to the test method and evaluation scale described above. It has been found that the porous spun fibers according to the invention have advantageous further properties which have already been discussed above, in particular a water retention capacity according to DIN 53184 of between 50 and 300%, advantageous values of the water retention capacity of between 65 and 200%, of the maximum tensile force according to DIN EN ISO 2062 of at least 6 cN/tex and of the maximum tensile force elongation of at least 4%.

Furthermore, they have a desirably smooth surface. In the context of the invention, it is advantageous that the addition of sulfur-containing chemicals of the viscose process or of metals, such as copper or lithium, or salts thereof can be avoided during the production of spun fibers.

The advantages associated with the complex proposal according to the invention to achieve the object described are diverse:

Surprisingly, it has been possible to find solution systems based on a specific ionic liquid which dissolve biopolymers, in particular cellulose in contents of up to, in particular, 35 wt. % with the addition of protic solvents, in particular water, in an amount of at least 5 wt. %. Moreover, equally surprisingly, industrially important system improvements are achieved by controlled admixing of protic solvents, in particular by water. These include the lowering of the viscosity of the solution system, which renders possible a simplified preparation of the solution, stabilization of the processing composition and improvement of the processability due to the change in the solution structure. Furthermore, the processing process becomes more flexible and economical, since the coagulation medium is already contained in the processing composition. By this means, diffusion processes for washing out the molten ionic liquid are accelerating considerably during the consolidation of the product.

In an embodiment of the invention given by way of example, the molten ionic liquid named is therefore initially introduced into the mixing vessel, a protic solvent, preferably water, is added in an amount of, in particular, from about 6 to 15 wt. % and the components are mixed intensively. This solution system is then adjusted to and thermostatically controlled at a suitable dissolving temperature. The biopolymer chosen, in particular starch or cellulose or derivatives thereof, is then added to the solution system in an amount suitable in practice, for example in an amount of from 5 to 35 wt. %, while stirring. Thermostatic control at a suitable dissolving temperature follows, until the dissolving of the biopolymer is most substantially concluded. In a preferred further processing, this solution is then filtered, degassed under a vacuum and extruded on a spinning unit through spinnerets into a coagulation bath. This comprises in particular and predominantly the protic solvent contained in the solution system. For consolidation of the product, the ionic liquid is washed out completely in the protic solvent and the product, for example a cellulose fiber, is dried. For recovery for renewed use, the protic solvent is removed from the ionic liquid down to the preferred content of from about 6 to 15 wt. % of water, if chosen, for example by distillation. Thereafter, the solution system is employed again for dissolving biopolymers. This embodiment given by way of example already shows that an improved processing, such as a flexible adjustment of product properties and a particularly economical process procedure, is rendered possible.

With respect to the spun fibers obtained according to the invention, the following advantages resulting from the particular procedure according to the invention are also to be pointed out: Outstanding solvents for cellulose can be employed, in particular in the form of 1-ethyl-3-methylimidazolium acetate (EMIM OAc). EMIM OAc leads to the following advantages: It is a liquid at room temperature. It leads to stable spinning solutions. Cellulose can be dissolved in an amount of up to 25 wt. % without problems with EMIM OAc. The preparation, filtration and the degassing of the spinning solution in industry is simple. Gel particles are very substantially ruled out. No noticeable sensitivity to air can be detected. The spinning solutions have an outstanding heat stability. The addition of stabilizers is not necessary. The spinning solution viscosity can be adjusted within a wide range (10 to 10,000 Pas), which means a high flexibility in the spinning process. The invention thus provides a very interesting process for environment-friendly production of "man-made" cellulose materials. Associated with this is a high production flexibility with a wide range of mechanical properties. No problems at all occur in subsequent processes, such as spinning of yarn, knitting or meshing, dyeing and during measures leading to improvement in fastness properties during use and manufacture, in particular color fastness.

The invention is to be explained in still more detail in the following with the aid of various examples.

When "percent by weight" is referred to in the examples, this is intended to relate to the total weight of the final solution.

EXAMPLE 1

Preparation of a Water-Containing Cellulose Solution in 1-Ethyl-3-Methylimidazolium Acetate (EMIM OAc))

100 g of water are added to 800 g of 1-ethyl-3-methylimidazolium acetate (EMIM OAc) at 50° C. in the course of 5 min, while stirring. The solvent mixture is initially introduced into a laboratory mixer and thermostatically controlled at 70° C. (dissolving temperature) in a circulating air oven. 100 g of cellulose (cotton linters DP 750) are added to this.

Mixing is carried out on level 2 for 40 s and the mixture is kept at 90° C. in the circulating air oven for 45 min. Thereafter, mixing is carried out on level 2 again for 40 s and the mixture is temperature-controlled at 90° C. for a further 45 min. The cellulose solution is filtered in a pressure-suction filter (15 µm filter fabric). The solution is stored at room temperature.

EXAMPLE 2

Preparation of a Water-Containing Cellulose Solution in EMIM Acetate 1,600 g of 1-ethyl-3-methylimidazolium acetate (EMIM OAc) are heated to 80° C. in a double-walled, thermostatically controllable reaction vessel with a blade stirrer, stirrer motor and reflux condenser. 200 g of water are added in the course of 5 min, while stirring. 200 g of cellulose (cotton linters DP 750) are added to the solvent mixture in the course of 15 min. Thereafter, the mixture is stirred at 80° C. for 2 h. The cellulose solution is filtered in a pressure-suction filter (15 µm filter fabric). The solution is stored at room temperature.

EXAMPLE 3

Preparation of a Water-Containing Cellulose Solution in EMIM Acetate 800 g of 1-ethyl-3-methylimidazolium acetate (EMIM OAc) and 100 g of water are initially introduced into a thermostatically controllable autoclave (fitted with a blade stirrer and stirrer motor as well as a filter unit) and the mixture is heated to 70 C, while stirring. 100 g of cellulose (cotton linters DP 750) are added to the solvent mixture. The autoclave is closed. Thereafter, stirring is carried out at 80° C. under a pressure of 3.5 bar for 2 h. The cellulose solution is discharged under pressure via a needle valve over the metal screen filter (multi-layered 15 µm) into a reservoir vessel. The solution is stored at room temperature.

EXAMPLE 4

Preparation of a Water-Containing Cellulose Solution in EMIM Acetate 1,600 g of 1-ethyl-3-methylimidazolium acetate (EMIM OAc) and 200 g of water are mixed at room temperature. 200 g of cellulose (cotton linters DP 750) are added to the solvent mixture. The mixture is metered via a metering unit with an intake of 25 g/m into an extruder. The extruder is fitted with a screw with a dynamic mixing head. The mixture is homogenized during a dwell time of 15 min at 100° C. and extruded via a filter head with a metal screen filter (multi-layered 15 µm) into a reservoir vessel. The solution is stored at room temperature.

EXAMPLE 5

Preparation of a Water-Containing Cellulose Solution in 1,3-dimethylimidazolium acetate (MMIM OAc)

The procedure is as in Example 1 at a dissolving temperature of 80° C.

EXAMPLE 6

Preparation of a Water-Containing Cellulose Solution in 1-butyl-3-methylimidazolium Acetate (BMIM OAc)

The procedure is as in Example 1 at a dissolving temperature of 75° C.

EXAMPLE 7

Preparation of a Water-Containing Cellulose Solution in 1-ethyl-3-methylimidazolium Chloride (EMIM Cl)

The procedure is as in Example 1 at a dissolving temperature of 100° C.

EXAMPLE 8

Preparation of a Water-Containing Cellulose Solution in 1-butyl-3-methylimidazolium Acetate (BMIM OAc)

The procedure is as in Example 1 at a dissolving temperature of 90° C.

EXAMPLES 9-13

Preparation of Water-Containing Cellulose Solutions with Various Celluloses

The procedure is as in Example 1. The celluloses employed are linters with DP 1250, DP 455 and DP 1950 and a eucalyptus pulp with DP 690. The zero viscosities of the filtered solutions, measured at 95° C., are shown in Table I:

TABLE I

|  | DP | Zero viscosity Pa · s |
|---|---|---|
| Linters | 1250 | 320 |
| Linters | 455 | 56 |
| Linters | 1950 | 850 |
| Eucalyptus pulp | 690 | 180 |

EXAMPLE 14

Variation of the Water Content

The procedure is as in Example 1. The water content of the cellulose solutions is adjusted to, respectively, 1 wt. % (addition of 10 g of water), 3 wt. % (addition of 40 g of water), 5 wt. % (addition of 50 g of water), 15 wt. % (addition of 150 g of water). The zero viscosities of the filtered solutions, measured at 95° C., are shown in Table II:

TABLE II

| Water content [wt. %] | Zero viscosity [Pa · s] |
|---|---|
| 1 | 178 |
| 3 | 190 |
| 5 | 215 |
| 10 | 225 |
| 15 | 230 |

EXAMPLE 15

Admixing of a Further Protic Solvent

The procedure is as in Example 1. On addition of water, 10 g of ethanol are additionally added.

EXAMPLE 16

Preparation of Highly Concentrated Cellulose Solutions

The procedure is as in Example 4. The cellulose concentration is increased to 20 wt. % in the solution by addition of 400 g of cellulose (linters DP 750).

EXAMPLE 17

Fiber Production

The solutions from Example 1 to 4 are processed to fibers on a wet spinning unit via a 100-hole die (80 µm hole diameter). Water is employed as the coagulation bath. Thereafter, the solvent is washed out and the fibers are dried.

EXAMPLE 18

Recycling

The coagulation bath from Example 17 is adjusted by means of heat to a water content of 10 wt. % (=recyclate). 900 g of the recyclate are initially introduced into a laboratory mixer and thermostatically controlled at 70° C. (dissolving temperature) in a circulating air oven, and 100 g of cellulose (cotton linters DP 750) are added. Mixing is carried out on level 2 for 40 s and the mixture is kept at 90° C. in the circulating air oven for 45 min. Thereafter, mixing is carried out on level 2 again for 40 s and the mixture is temperature-controlled at 90° C. for a further 45 min. The cellulose solution is filtered in a pressure-suction filter (15 µm filter fabric). The solution is stored at room temperature.

EXAMPLE 19

Fiber Production with an Air Gap

The solution from Example 1 is processed with a conventional wet spinning unit (type 1) and via an air gap after the spinneret (type 2). The description of the units and processes can be seen from the following Table III.

TABLE III

|  | Type 1 | Type 2 |
| --- | --- | --- |
| Air gap | — | 15 mm |
| Die | 100 holes/60 μm | 28 holes/100 μm |
| Spinning temperature | 80° C. | 80° C. |
| Coagulation medium | water (80° C.) | water (20° C.) |
| Washing medium | water (60° C.) | water (60° C.) |
| Spinning speed | 20 m/min | 40 m/min |

With the aid of the processes described above, the fiber properties shown in the following Table IV result:

TABLE IV

|  | Type 1 | Type 2 |
| --- | --- | --- |
| Fineness (individual filament) | 2.5 dtex | 3.5 dtex |
| Strength*** | 19 cN/dtex | 36 cN/dtex |
| Elongation** | 15% | 10% |
| WRC* | 95% | 65% |
| Crystallinity CI | 56% | 71% |

*Water retention capacity
**Maximum tensile force elongation
***Maximum tensile force

EXAMPLE 20

Fiber Production with EMIM Cl

The solution from Example 7 was processed with the spinning units from Example 19.

The description of the units and processes can be seen from the following Table V:

TABLE V

|  | Type 1 | Type 2 |
| --- | --- | --- |
| Air gap | — | 15 mm |
| Die | 100 holes/60 μm | 28 holes/100 μm |
| Spinning temperature | 100° C. | 100° C. |
| Coagulation medium | water (90° C.) | water (20° C.) |
| Washing medium | water (60° C.) | water (60° C.) |
| Spinning speed | 20 m/min | 40 m/min |

With the aid of the processes described above, the fiber properties shown in the following Table VI result:

TABLE VI

|  | Type 1 | Type 2 |
| --- | --- | --- |
| Fineness (individual filament) | 2.5 dtex | 3.5 dtex |
| Strength | 17 cN/dtex | 34 cN/dtex |
| Elongation | 16% | 11% |
| WRC | 92% | 68% |
| Crystallinity $C_I$ | 54% | 69% |

EXAMPLE 21

Fiber Production with BMIM OAc

The solution from Example 6 was processed with the spinning units from Example 19.

The description of the units and processes can be seen from the following Table VII:

TABLE VII

|  | Type 1 | Type 2 |
| --- | --- | --- |
| Air gap | — | 15 mm |
| Die | 100 holes/60 μm | 28 holes/100 μm |
| Spinning temperature | 60° C. | 60° C. |
| Coagulation medium | water (60° C.) | water (20° C.) |
| Washing medium | water (60° C.) | water (60° C.) |
| Spinning speed | 20 m/min | 40 m/min |

With the aid of the processes described above, the fiber properties shown in the following Table VIII result:

TABLE VIII

|  | Type 1 | Type 2 |
| --- | --- | --- |
| Fineness (individual filament) | 2.0 dtex | 3.1 dtex |
| Strength | 14.5 cN/dtex | 27 cN/dtex |
| Elongation | 13.5% | 12% |
| WRC | 110% | 84% |
| Crystallinity $C_I$ | 36% | 56% |

EXAMPLE 22

Fiber Production with BMIM Cl

The solution from Example 8 was processed with the spinning units from Example 19.

The description of the units and processes can be seen from the following Table IX:

TABLE IX

|  | Type 1 | Type 2 |
| --- | --- | --- |
| Air gap | — | 15 mm |
| Die | 100 holes/60 μm | 28 holes/100 μm |
| Spinning temperature | 80° C. | 80° C. |
| Coagulation medium | water (80° C.) | water (20° C.) |
| Washing medium | water (60° C.) | water (60° C.) |
| Spinning speed | 20 m/min | 40 m/min |

With the aid of the processes described above, the fiber properties shown in the following Table X result:

TABLE X

|  | Type 1 | Type 2 |
| --- | --- | --- |
| Fineness (individual filament) | 2.0 dtex | 3.0 dtex |
| Strength | 19.5 cN/dtex | 29 cN/dtex |
| Elongation | 14% | 9% |
| WRC | 104% | 76% |
| Crystallinity $C_I$ | 42% | 57% |

EXAMPLE 23

Fiber Production after Preparation of the Solution in an Extruder

The solution from Example 4 was processed with the spinning units from Example 19. No change was made to the process parameters here.

With the aid of the processes described above, the fiber properties shown in the following Table XI result:

TABLE XI

|  | Type 1 | Type 2 |
| --- | --- | --- |
| Fineness (individual filament) | 2.5 dtex | 3.5 dtex |
| Strength | 15.5 cN/dtex | 32 cN/dtex |
| Elongation | 17% | 11.5% |
| WRC | 89% | 74% |
| Crystallinity $C_I$ | 53% | 66% |

EXAMPLE 24

Fiber Production with Linters DP 1250

The solution from Example 9 was processed with the spinning units from Example 19.

The description of the units and processes can be seen from the following Table XII:

TABLE XII

|  | Type 1 | Type 2 |
| --- | --- | --- |
| Air gap | — | 15 mm |
| Die | 100 holes/60 μm | 28 holes/100 μm |
| Spinning temperature | 100° C. | 100° C. |
| Coagulation medium | water (90° C.) | water (20° C.) |
| Washing medium | water (60° C.) | water (60° C.) |
| Spinning speed | 20 m/min | 40 m/min |

With the aid of the processes described above, the fiber properties shown in the following Table XIII result:

TABLE XIII

|  | Type 1 | Type 2 |
| --- | --- | --- |
| Fineness (individual filament) | 2.5 dtex | 3.5 dtex |
| Strength | 19 cN/dtex | 41 cN/dtex |
| Elongation | 14% | 7% |
| WRC | 87% | 64% |
| Crystallinity $C_I$ | 55% | 62% |

EXAMPLE 25

Fiber Production with Linters DP 1950

The solution from Example 11 was processed with the spinning unit type 2 from Example 19.

The description of the units and processes can be seen from the following Table XIV:

TABLE XIV

| Unit | Type 2 |
| --- | --- |
| Air gap | 25 mm |
| Die | 28 holes/100 μm |
| Spinning temperature | 130° C. |
| Coagulation medium | water (20° C.) |
| Washing medium | water (60° C.) |
| Spinning speed | 40 m/min |

With the aid of the processes described above, the fiber properties shown in the following Table XV result:

TABLE XV

| Unit | Type 2 |
| --- | --- |
| Fineness (individual filament) | 3.2 dtex |
| Strength | 44 cN/dtex |
| Elongation | 6.5% |
| WRC | 56% |
| Crystallinity $C_I$ | 68% |

EXAMPLE 26

Fiber Production with Linters Dp 455

The solution from Example 10 was processed with the spinning units from Example 19.

The description of the units and processes can be seen from the following Table XVI:

TABLE XVI

|  | Type 1 | Type 2 |
| --- | --- | --- |
| Air gap | — | 10 mm |
| Die | 100 holes/60 μm | 28 holes/100 μm |
| Spinning temperature | 40° C. | 40° C. |
| Coagulation medium | water (40° C.) | water (20° C.) |
| Washing medium | water (60° C.) | water (60° C.) |
| Spinning speed | 20 m/min | 40 m/min |

With the aid of the processes described above, the fiber properties shown in the following Table XVII result:

TABLE XVII

|  | Type 1 | Type 2 |
| --- | --- | --- |
| Fineness (individual filament) | 2.0 dtex | 2.5 dtex |
| Strength | 13 cN/dtex | 26 cN/dtex |
| Elongation | 18% | 13% |
| WRC | 116% | 88% |
| Crystallinity $C_I$ | 37% | 62% |

EXAMPLE 27

Fiber Production with a Solution Water Content of 10 wt. %

The solution from Example 15 with a water content of 10 wt. % was processed with the spinning units from Example 19. No change was made to the spinning parameters here.

With the aid of the processes described above, the fiber properties shown in the following Table XVIII result:

TABLE XVIII

|  | Type 1 | Type 2 |
| --- | --- | --- |
| Fineness (individual filament) | 2.5 dtex | 3.5 dtex |
| Strength | 17.5 cN/dtex | 26.3 cN/dtex |
| Elongation | 19% | 12% |
| WRC | 108% | 68% |
| Crystallinity $C_I$ | 48% | 64% |

EXAMPLE 28

Recycling of EMIM OAc

The solution from Example 1 is processed by a conventional spinning process (type 1 Example 19). The coagulation bath and the washing baths are combined. Water is distilled off from this mixture down to a residual content of 5 wt. %. A spinning solution was again prepared according to Example 1 with the residue (EMIM OAc+5 wt. % of water) and was processed again by the type 1 spinning process from Example 19. After a multiple process cycle, the dissolving properties remained unchanged, and furthermore the filtration, the spinnability and the fiber properties.

EXAMPLE 29

Determination of Copper and Sulfur 1 g of fibers from Example 19 was investigated in respect of the copper and sulfur content by means of ICP-OES analysis after digestion by acid. The results of the analysis are summarized in Table XIX:

TABLE XIX

| Fiber | Sulfur [mg/g] | Copper [µg/g] |
|---|---|---|
| Type 1 | 0.05 | 4.3 |
| Type 2 | 0.01 | 3.9 |

EXAMPLE 30

Preparation of a Water-Containing Cellulose solution in 1-ethyl-3-methylimidazolium diethyl-phosphate (EMIM DEP)

The procedure is as in Example 1.60 g of water are added.

EXAMPLE 31

Preparation of a Water-Containing Cellulose Solution in 1-methyl-3-methylimidazolium dimethyl-phosphate (MMIM DMP)

The procedure is as in Example 1.60 g of water are added.

EXAMPLE 32

Admixing of a Further Protic Solvent

The procedure is as in Example 1. During the addition of water, 10 g of methanol are additionally added.

EXAMPLE 33

Admixing of a Further Protic Solvent

The procedure is as in Example 1. During the addition of water, 10 g of isopropanol are additionally added.

EXAMPLE 34

Preparation of a Water-Containing Cellulose/Chitosan Solution in 1-ethyl-3-methylimidazolium acetate (EMIM OAc) in a Laboratory Mixer 100 g of water are added to 800 g of 1-ethyl-3-methylimidazolium acetate (EMIM OAc) at 50° C. in the course of 5 min, while stirring. The solvent mixture is initially introduced into a laboratory mixer and thermostatically controlled at 70° C. (dissolving temperature) in a circulating air oven, and 80 g of cellulose (cotton linters DP 750) and 20 g of chitosan are added. Mixing is carried out on level 2 for 40 s and the mixture is kept at 90° C. in the circulating air oven for 45 min. Thereafter, mixing is carried out on level 2 again for 40 s and the mixture is temperature-controlled at 90° C. for a further 45 min. The cellulose/chitosan solution is filtered in a pressure-suction filter (15 µm filter fabric). The solution is stored at room temperature.

EXAMPLE 35

Preparation of a Water-Containing Cellulose/Starch Solution in 1-Ethyl-3-1-methylimidazolium acetate (EMIM OAc) in a Laboratory Mixer 60 g of water are added to 800 g of ethyl-3-methylimidazolium acetate (EMIM OAc) at 50° C. in the course of 5 min, while stirring. The solvent mixture is initially introduced into a laboratory-mixer and thermostatically controlled at 60° C. (dissolving temperature) in a circulating air oven, and 80 g of cellulose (cotton linters DP 750) and 20 g of edible starch are added. Mixing is carried out on level 2 for 60 s and the mixture is kept at 80° C. in the circulating air oven for 45 min. Thereafter, mixing is carried out on level 2 again for 60 s and the mixture is temperature-controlled at 80° C. for a further 45 min. The cellulose/starch solution is filtered in a pressure-suction filter (15 µm filter fabric). The solution is stored at room temperature.

EXAMPLE 36

Fiber Production

This example is an implementation of Example 17. However, ethanol is employed as the coagulation bath. The fibers obtained are washed out in ethanol.

EXAMPLE 37

Fiber Production

This example is an implementation of Example 17. Isopropanol is employed as the coagulation bath. The fibers obtained are washed out in isopropanol.

EXAMPLE 38

Preparation of a Water-Containing Cellulose Solution in 1-ethyl-3-methylimidazolium Formate (EMIM Formate)

0.3 g of water is added to 4.45 g of 1-ethyl-3-methylimidazolium formate (EMIM formate) at 50° C. in the course of 5 min, while stirring. The solvent mixture is initially introduced into a laboratory mixer and thermostatically controlled at 70° C. (dissolving temperature) in a circulating air oven. 0.25 g of cellulose (Avicel DP 300) is added to this. The mixture (5 wt. % of cellulose, 6 wt. % of water, 89 wt. % of EMIM formate) is mixed on level 2 for 40 s and is kept at 90° C. in the circulating air oven for 45 min. Thereafter, mixing is carried out on level 2 again for 40 s and the mixture is temperature-controlled at 90° C. for a further 45 min. The cellulose solution is filtered in a pressure-suction filter (15 μm filter fabric). The solution is stored at room temperature.

EXAMPLE 39

Preparation of a Water-Containing Cellulose Solution in 1-ethyl-3-methylimidazolium Propionate EMIM Propionate The procedure is as described in Example 38. Instead of EMIM formate, EMIM propionate is used here.

EXAMPLE 40

Preparation of a Water-Containing Cellulose Solution in 1-ethyl-3-methylimidazolium Octanoate (EMIM Octanoate)

The procedure is as described in Example 38. Instead of EMIM formate, EMIM octanoate is used here.

EXAMPLE 41

Preparation of a Water-Containing Cellulose Solution in 1,3-diethylimidazolium Acetate (EEIM Acetate)

1 g of water, is added to 9 g of 1,3-diethylimidazolium acetate (EEIM acetate) at 50° C. in the course of 5 min, while stirring. The solvent mixture is initially introduced into a laboratory mixer and thermostatically controlled at 70° C. (dissolving temperature) in a circulating air oven. 1 g of cellulose (Avicel DP 300) is added to this. The mixture (9.1 wt. of cellulose, 9.1 wt. % of water, 81.8 wt. % of EEIM acetate) is mixed on level 2 for 40 s and the mixture is kept at 90° C. in the circulating air oven for 45 min. Thereafter, mixing is carried out on level 2 again for 40 s and the mixture is temperature-controlled at 90° C. for a further 45 min. The cellulose solution is filtered in a pressure-suction filter (15 μm filter fabric). The solution is stored at room temperature.

EXAMPLE 42

Preparation of a Water-Containing Starch Solution (Amylopectin From Maize) in 1-ethyl-3-methylimidazolium Acetate (EMIM Acetate)

5 g of water are added to 50 g of 1-ethyl-3-methylimidazolium acetate (EMIM acetate) at room temperature in the course of 5 min, while stirring. The solvent mixture is initially introduced into a laboratory mixer and thermostatically controlled at 100° C. (dissolving temperature) in a circulating air oven. 5 g of starch (origin: amylopectin from maize) are added to this. The mixture (8.3 wt. % of amylopectin, 8.3 wt. % of water, 83.3 wt. % of EMIM acetate) is mixed on level 2 for 40 s and the mixture is kept at 100° C. in the circulating air oven for 45 min. Thereafter, mixing is carried out on level 2 again for 40 s and the mixture is temperature-controlled at 100° C. for a further 45 min. The starch solution is filtered in a pressure-suction filter (15 μm filter fabric). The solution is stored at room temperature.

Note regarding the examples in which cellulose is subjected to wet spinning: The spun fibers obtained by this process all have a wet fibrillation rating of less than 2.

The invention claimed is:

1. A process for the preparation of regenerated biopolymers in the form of carbohydrates, comprising dissolving biopolymers in the form of carbohydrates in a solution system comprising a molten ionic liquid comprising a cation that is formed from compounds which contain at least one five-to six membered heterocyclic radical and a protic solvent, and precipitating dissolved biopolymers in the form of carbohydrates in a coagulation medium, comprising a solvent which does not dissolve the biopolymers and is miscible with the molten ionic liquid, wherein said protic solvent is selected from the group consisting of
1) water as the sole protic solvent which is present in said solution system in an amount of at least 6 wt. %,
2) at least 0.1 wt. % based on said solution system of at least one protic solvent selected from the group consisting of methanol, ethanol, 1-propanol, 2-propanol and 1-butanol; and
3) water and at least one protic solvent selected from the group consisting of methanol, ethanol, 1-propanol, 2-propanol and 1-butanol.

2. The process according to claim 1, wherein the ionic liquid comprises a substituted or unsubstituted imidazolium cation as the cation.

3. The process according to claim 2, wherein the imidazolium cation of the ionic liquid is substituted by ($C_1$-$C_6$)-alkyl groups in the 1- and 3-position or in the 1-, 2- and 3-position.

4. The process according to claim 3, wherein the imidazolium cation is at least one cation selected from the group consisting of 1-ethyl-3-methylimidazolium, 1,3-dimethylimidazolium or 1-butyl-3-methylimidazolium cation.

5. The process according to claim 1, wherein water is the sole protic solvent and the solution system comprises about 6 to 15 wt. % of water.

6. The process according to claim 1, wherein said protic solvent is at least 0.1 wt. % based on said solution system of at least one protic solvent selected from the group consisting of methanol, ethanol, 1-propanol, 2-propanol and 1-butanol and said solution system comprises the protic solvent in an amount of from about 1 to 10 wt. %.

7. The process according to claim 1, wherein the anion of the ionic liquid is at least one anion selected from the group consisting of a halide, perchlorate, pseudohalide, sulfate, phosphate, alkyl-phosphate or a $C_1$-$C_6$-carboxylate ion.

8. The process according to claim 1, wherein the molten ionic liquid has a melting point of from −100 to +150 ° C.

9. The process according to claim 1, wherein the ionic liquid is at least one ionic liquid selected from the group consisting of 1-ethyl-3-methylimidazolium acetate, 1,3-dimethylimidazolium acetate, 1-ethyl-3-methyl-imidazolium chloride, 1-butyl-3-methylimidazolium acetate, 1-ethyl-3-methylimidazolium diethylphosphate, 1-methyl-3-methylimidazolium dimethylphosphate, 1-ethyl-3-methylimidazolium formate, 1-ethyl-3-methylimidazolium octanoate, 1,3-diethylimidazolium acetate and 1-ethyl-3-methylimidazolium propionate.

10. The process according to claim 1, wherein the carbohydrate is cellulose dissolved in the solution system, or a derivative thereof, and has an average degree of polymerization of from about 200 to 3,500 and wherein the cellulose and/or derivative thereof is present in the solution system in an amount of from about 1 to 35 wt. %.

11. The process according to claim 1, wherein said carbohydrates are esters or ethers of starch and cellulose.

12. The process according to claim 1, wherein the solution system has a zero viscosity (measured with a rotary viscometer) of between about 5 and 150,000 Pa·s.

13. The process according to claim 1, wherein the solution system is subjected to wet spinning.

14. The process according to claim 1, further comprising spinning the solution system comprising the biopolymers for the production of non-fibrillated fibers.

15. The process according to claim 13, wherein an air gap spinning unit is employed in order to obtain staple fibers having a high degree of crystallinity (CI >0.5).

16. The process according to claim 1, wherein to adjust specific properties of the precipitated material obtained additives are added, the additives being added to the coagulation medium, the solution system and/or a subsequent modification bath.

17. The process according to claim 16, wherein additives in the form of microcapsules, pore-forming agents, plasticizers, matting agents, flameproofing agents, bactericides, crosslinking agents, hydrophobizing agents, antistatics and/or coloring agents are used.

18. The process according to claim 1, wherein said coagulation medium comprises an alcohol, a mixture of alcohols or a mixture of alcohol(s) with water or solely water and no additives are added.

19. The process according to claim 18, wherein the alcohol is at least one alcohol selected from the group consisting of methanol, ethanol, propanol and/or butanol.

20. The process according to claim 1, wherein said liquid phase is recovered after partial evaporation.

21. The process according to claim 1, wherein said molten ionic liquid has a melting point of from −100 to 100° C.

22. The process according to claim 1, wherein said molten ionic liquid has a melting point of from −30 to 80° C.

* * * * *